United States Patent
Yamate

(10) Patent No.: US 7,166,972 B2
(45) Date of Patent: *Jan. 23, 2007

(54) VERTICAL DEFLECTION APPARATUS

(75) Inventor: Kazunori Yamate, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 143 days.

This patent is subject to a terminal disclaimer.

(21) Appl. No.: 10/987,370

(22) Filed: Nov. 12, 2004

(65) Prior Publication Data

US 2005/0127852 A1    Jun. 16, 2005

Related U.S. Application Data

(62) Division of application No. 10/276,472, filed on Nov. 14, 2002, now Pat. No. 6,831,427.

(30) Foreign Application Priority Data

Mar. 15, 2001 (JP) ............... 2001-073732
May 10, 2001 (JP) ............... 2001-140154
Mar. 5, 2002 (JP) ............... 2002-058293

(51) Int. Cl.
  *G09G 1/04* (2006.01)
(52) U.S. Cl. ............ 315/371; 315/392; 315/399
(58) Field of Classification Search ......... 315/364, 315/368.18, 368.21, 368.22, 368.25, 368.28, 315/370, 371, 806, 807, 391, 392, 399
  See application file for complete search history.

(56) References Cited

U.S. PATENT DOCUMENTS

| | | | | |
|---|---|---|---|---|
| 4,118,656 A | * | 10/1978 | Dietz ................. | 315/371 |
| 4,335,333 A | | 6/1982 | Ramsay et al. ........ | 315/371 |
| 4,422,020 A | * | 12/1983 | Lehnert et al. ....... | 315/371 |
| 4,593,308 A | | 6/1986 | Kemplin ............... | 348/189 |
| 4,642,530 A | | 2/1987 | Rodriguez-Cavazos ... | 315/371 |
| 4,810,939 A | | 3/1989 | Watanabe et al. ...... | 315/371 |
| 4,916,365 A | * | 4/1990 | Arai .................. | 315/383 |
| 4,961,030 A | | 10/1990 | Ogino et al. ......... | 315/368.23 |

(Continued)

FOREIGN PATENT DOCUMENTS

JP    62-5547 B2    9/1981

(Continued)

*Primary Examiner*—Thuy Vinh Tran
(74) *Attorney, Agent, or Firm*—Akin Gump Strauss Hauer & Feld, LLP

(57) ABSTRACT

A vertical deflection apparatus supplies a vertical deflection current to a vertical deflection coil to deflect an electron beam in the vertical direction of a screen. The apparatus includes: a vertical deflection current output circuit that outputs a vertical deflection current; a correction circuit that outputs a correction signal periodically changing in a parabolic shape in a horizontal scanning period to correct a north-south pincushion distortion; a modulation circuit that modulates the phase of the correction signal output from the correction circuit in a vertical scanning period; and a superimposition device that superimposes a correction current based on an output signal of the modulation circuit on the vertical deflection current. The correction circuit includes: a folded waveform generator; a turn-up waveform generator; and a correction signal generator that generates the correction signal having a peak corresponding to a turn-up point of a turn-up waveform generated by the turn-up waveform generator.

10 Claims, 17 Drawing Sheets

U.S. PATENT DOCUMENTS

| | | | |
|---|---|---|---|
| 4,972,127 A | 11/1990 | Rodriguez-Cavazos et al. | 315/371 |
| 5,420,483 A | 5/1995 | Suzuki et al. | 315/371 |
| 5,519,447 A * | 5/1996 | Shima et al. | 348/556 |
| 5,583,400 A | 12/1996 | Hulshof et al. | 315/371 |
| 5,978,040 A * | 11/1999 | Diamant | 348/556 |
| 6,084,646 A * | 7/2000 | Lee | 348/806 |
| 6,295,100 B1 | 9/2001 | Carpentier et al. | 348/807 |
| 6,437,523 B1 * | 8/2002 | Truskalo et al. | 315/371 |
| 6,452,347 B1 * | 9/2002 | Yamate et al. | 315/371 |

FOREIGN PATENT DOCUMENTS

| | | |
|---|---|---|
| JP | 58-073281 A | 5/1983 |
| JP | 58-75379 A | 5/1983 |
| JP | 59-274 A | 1/1984 |
| JP | 59000274 A | 1/1984 |
| JP | 62-31268 A | 2/1987 |
| JP | 62-146362 U | 9/1987 |
| JP | 62-031268 * | 10/1987 |
| JP | 62-268272 A | 11/1987 |
| JP | 2-231872 A | 9/1990 |
| JP | 0 674 432 A1 | 9/1995 |
| JP | 7-123287 B2 | 12/1995 |
| JP | 8-46811 A | 2/1996 |

* cited by examiner

F I G. 1 3
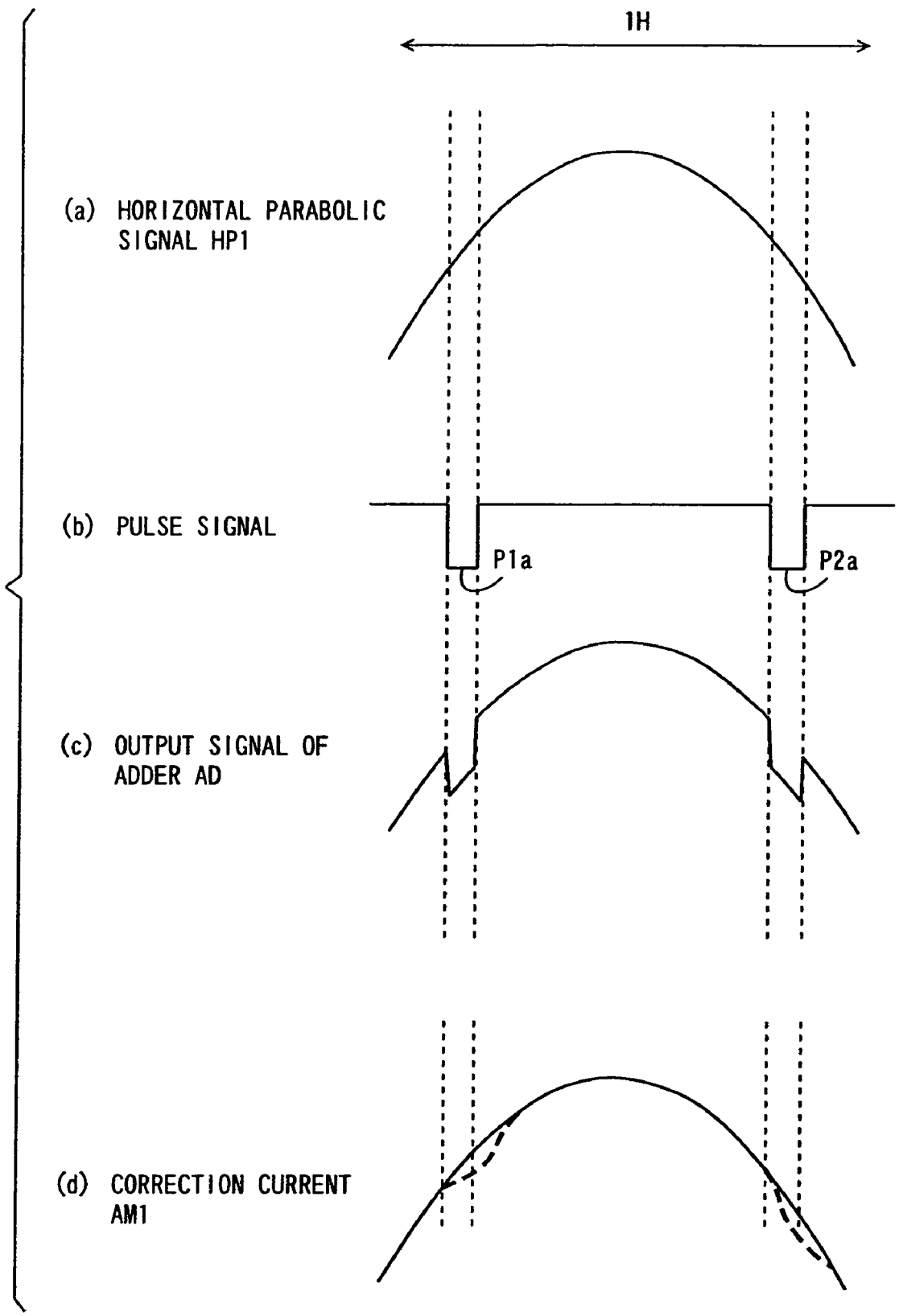

NS PINCUSHION DISTORTION
ON SCREEN OF CRT

NS PINCUSHION DISTORTION CORRECTION
CURRENT SUPERIMPOSED WITH VERTICAL
DEFLECTION CURRENT

FIG. 18a PRIOR ART    VERTICAL DEFLECTION CURRENT VI
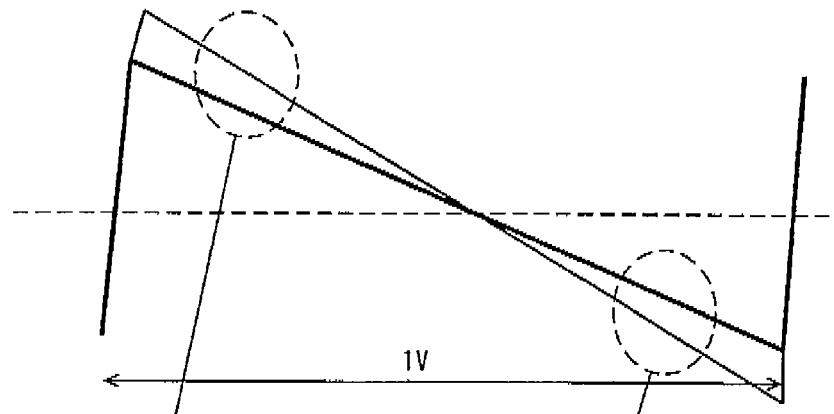
FIG. 18b PRIOR ART    CORRECTION CURRENT am
FIG. 18c PRIOR ART    HV CROSSTALK COMPONENT CR
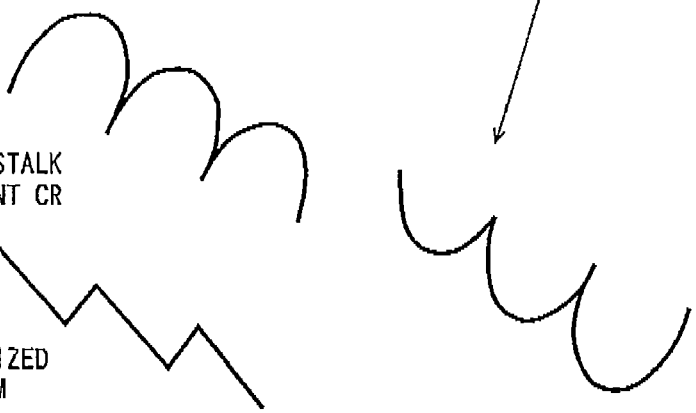
FIG. 18d PRIOR ART    SYNTHESIZED WAVEFORM
FIG. 18e PRIOR ART    PEAK OF CORRECTION CURRENT IS SHIFTED LEFT
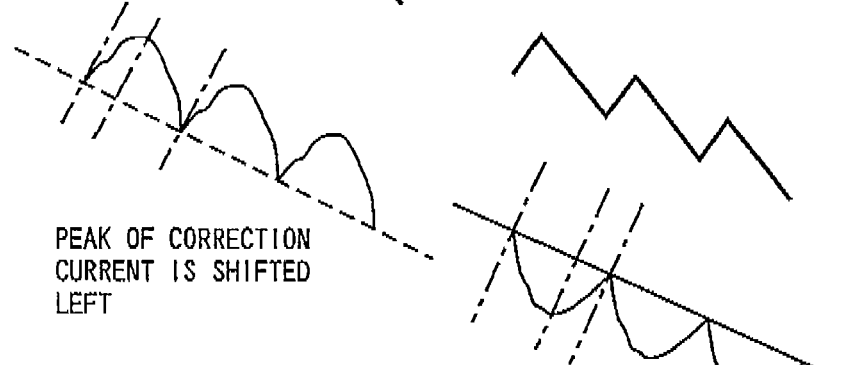
PEAK OF CORRECTION CURRENT IS SHIFTED RIGHT FIG. 19a
PRIOR ART
FIG. 19b
PRIOR ART
FIG. 19c
PRIOR ART
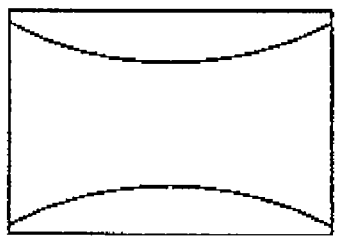 + 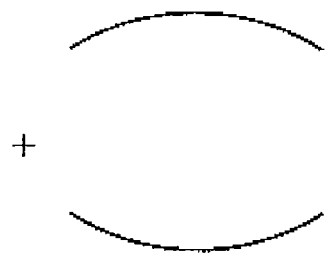 ⇒ 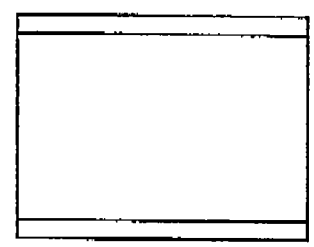
NS PINCUSHION
DISTORTION AT TIME
OF UNCORRECTION
ON SCREEN OF CRT
CORRECTION
WAVEFORM
SCREEN OF CRT AT
TIME OF CORRECTION
FIG. 20a
PRIOR ART
FIG. 20b
PRIOR ART
FIG. 20c
PRIOR ART
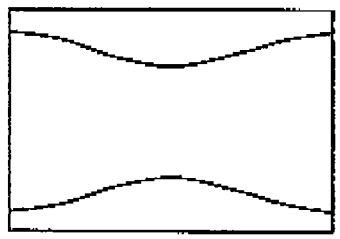 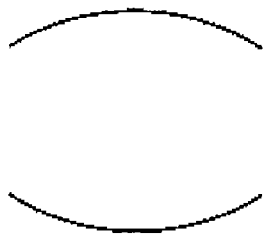 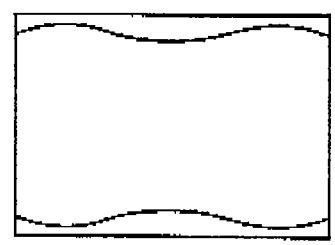
NS PINCUSHION
DISTORTION AT TIME
OF UNCORRECTION
ON SCREEN OF CRT
CORRECTION
WAVEFORM
SCREEN OF CRT AT
TIME OF CORRECTION
(GULL-WING
DISTORTION)
FIG. 21
PRIOR ART
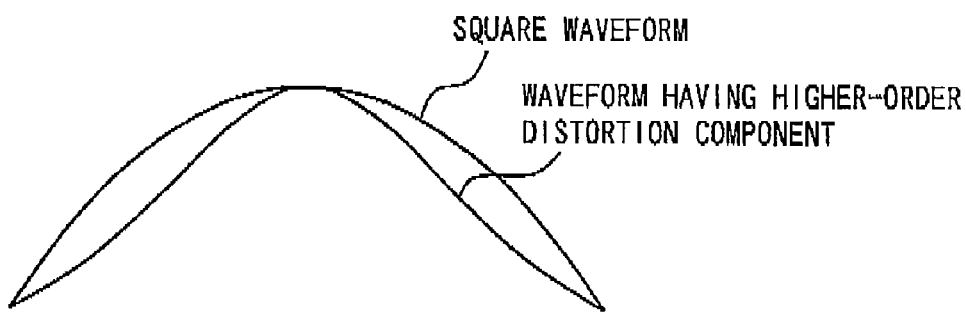

US 7,166,972 B2

VERTICAL DEFLECTION APPARATUS

This application is a division of application Ser. No. 10/276,472 filed Nov. 14, 2002, entitled "Vertical Deflection Apparatus" which is now U.S. Pat. No. 6,831,427 B2, and is hereby incorporated by reference in its entirety.

The present invention relates to a vertical deflection apparatus comprising a correction circuit that corrects a north-south pincushion distortion on a CRT (Cathode-Ray Tube).

BACKGROUND ART

In a CRT, the distance from its deflecting center point to its screen (fluorescent screen) increases toward its periphery, so that the swing of an electron beam is the largest at four corners of the screen. Consequently, a north-south (upper-lower) pincushion distortion and an east-west (right-left) pincushion distortion are generated in an image displayed on the screen of the CRT. Particularly, the north-south pincushion distortion is referred to as an NS pincushion distortion, and the east-west horizontal pincushion distortion is referred to as an EW pincushion distortion. The larger the deflection angle of the electron beam is, the larger the pincushion distortions become.

FIG. 16(a) is a diagram showing an example of an NS pincushion distortion on a screen of a CRT, and FIG. 16(b) is a waveform diagram showing an NS pincushion distortion correction current superimposed on a vertical deflection current. In FIG. 16, H indicates a horizontal scanning period, and V indicates a vertical scanning period.

As shown in FIG. 16(a), the NS pincushion distortion on the screen of the CRT is in a shape which is constricted at its center, as compared with both its right and left ends. The NS pincushion distortion can be corrected by respectively moving the centers of horizontal scanning lines upward and downward, as indicated by arrows. Therefore, an NS pincushion distortion correction current (hereinafter abbreviated as a correction current) am which changes in a parabolic shape in the horizontal scanning period is superimposed on a sawtooth vertical deflection current VI which changes in the vertical scanning period, as shown in FIG. 16(b). The correction current am has a positive polarity in the first half of a vertical scanning interval (the upper half of the screen), and has a negative polarity in the latter half of the vertical scanning interval (the lower half of the screen). The amplitude of the correction current am increases toward upper and lower ends of the screen from the center thereof.

In order to superimpose a correction current on a vertical deflection current, a system using a supersaturated reactor and a transformer system in which a transformer is inserted in series with a vertical deflection coil and is driven by a parabolic current having a horizontal scanning period (hereinafter referred to as a horizontal parabolic current) have been conventionally employed.

FIG. 17 is a schematic view showing the correction of an NS pincushion distortion by the conventional supersaturated reactor system, where FIG. 17(a) is a diagram showing a supersaturated reactor, and FIG. 17(b) is a diagram showing the relationship between a magnetic flux density B and a magnetic field H in the supersaturated reactor.

In FIG. 17(a), a core 50 in the supersaturated reactor has three legs. Further, a core 51 is arranged on the core 50, and a permanent magnet 52 is arranged on the core 51. A horizontal deflection current HI is caused to flow through windings $L_{H1}$ and $L_{H2}$ of the legs on both sides of the core 50. Consequently, a magnetic flux $\Phi_H$ is generated. A vertical deflection current VI is caused to flow through a winding $L_V$ of the leg at the center of the core 50. Consequently, a magnetic flux $\Phi_V$ is generated. Further, a magnetic flux $\Phi_B$ is generated by the permanent magnet 52. In the supersaturated reactor, when the magnetic field H is strengthened, the magnetic flux density B is saturated, as shown in FIG. 17(b).

By the configuration shown in FIG. 17(a), the correction current am is superimposed on the vertical deflection current VI supplied to the vertical deflection coil, as shown in FIG. 16(b). Also in the transformer system, the same control is carried out. In such a way, the NS pincushion distortion is corrected.

A horizontal deflection coil and a vertical deflection coil are arranged so as to be orthogonal inside a deflection yoke. From a problem in the fabrication of the deflection yoke, orthogonality between the horizontal deflection coil and the vertical deflection coil is not necessarily ensured. Accordingly, a current component caused by a horizontal deflection current is induced by electromagnetic coupling from the horizontal deflection coil to the vertical deflection coil inside the deflection yoke.

Furthermore, a horizontal flyback pulse generated in the horizontal deflection coil in a horizontal blanking interval reaches a voltage of a thousand and several hundred Vp-p (volt peak-to-peak), and a harmonic component of the horizontal flyback pulse has a frequency which is several ten times the horizontal scanning frequency. Accordingly, the horizontal deflection coil and the vertical deflection coil are coupled to each other through a stray capacitance between the horizontal deflection coil and the vertical deflection coil. Consequently, a current component caused by the horizontal deflection current is induced by electrostatic coupling from the horizontal deflection coil to the vertical deflection coil.

Induction of a current component from a horizontal deflection coil to a vertical deflection coil is referred to as HV crosstalk, and a current component induced from the horizontal deflection coil to the vertical deflection coil is referred to as an HV crosstalk component. When the HV crosstalk component is superimposed on a vertical deflection current supplied to the vertical deflection coil, scanning lines are distorted, so that an image to be displayed is distorted.

A current component caused by the vertical deflection current is induced from the vertical deflection coil to the horizontal deflection coil. However, the horizontal deflection current is as large as several ten Ap-p (ampere peak-to-peak), while the vertical deflection current is as small as 1 to 2 Ap-p. Further, a voltage of a pulse generated in the vertical deflection coil in a vertical blanking interval is less than 100 volts, and the frequency thereof is from several ten hertz to a maximum of several hundred hertz. Therefore, the current components respectively induced by electromagnetic coupling and electrostatic coupling from the vertical deflection coil to the horizontal deflection coil are so small that they are hardly worth consideration.

In the correction of the NS pincushion distortion using the conventional supersaturated reactor system and transformer system, the HV crosstalk generated inside the deflection yoke is not considered. FIG. 18 is a diagram for explaining the HV crosstalk.

FIG. 18(a) illustrates a vertical deflection current VI on which a correction current is superimposed, FIG. 18(b) illustrates a correction current am, FIG. 18(c) illustrates an HV crosstalk component CR, and FIG. 18(d) illustrates a synthesized waveform of the correction current am and the HV crosstalk component CR. In FIG. 18(a), the correction current am superimposed on the vertical deflection current VI is roughly illustrated. In FIG. 18, V indicates a vertical scanning period.

As shown in FIG. 18(*a*), a correction current, which changes in a parabolic shape in a horizontal scanning period, is superimposed on the sawtooth vertical deflection current VI, which changes in the vertical scanning period, in order to correct an NS pincushion distortion. The polarity of the correction current am is reversed in the upper half and the lower half of a screen of a CRT, as described above. Consequently, the correction current am superimposed on the vertical deflection current VI differs in polarity in the upper half and the lower half of the vertical deflection current VI, as shown in FIG. 18(*b*).

As shown in FIG. 18(*c*), the HV crosstalk component CR which periodically changes in a horizontal scanning periods within a vertical scanning interval is generated from a horizontal deflection coil to a vertical deflection coil. The polarity of the HC crosstalk component CR is the same within the vertical scanning interval.

When the HV crosstalk component CR is synthesized with the correction current am, as shown in FIG. 18(*d*), therefore, the peak of the correction current am in the first half of the vertical scanning interval is shifted to the left, and the peak of the correction current in the latter half thereof is shifted to the right. Consequently, a distortion in an image which differs in the upper half and the lower half of the screen of the CRT is generated.

Furthermore, an NS pincushion distortion generated by a combination of the deflection yoke and the CRT is ideally symmetrical. However, the NS pincushion distortion may not, in some cases, be symmetrical due to various variations in characteristics. Consequently, transverse lines may not, in some cases, be displayed straight on the screen of the CRT.

FIG. 19 is a conceptual diagram for explaining the correction of an NS pincushion distortion, where FIG. 19(*a*) illustrates an NS pincushion distortion at the time of uncorrection on a screen of a CRT, FIG. 19(*b*) illustrates a correction waveform, and FIG. 19(*c*) illustrates the screen of the CRT at the time of correction.

When the NS pincushion distortion shown in FIG. 19(*a*) is corrected using the parabolic correction waveform shown in FIG. 19(*b*), the NS pincushion distortion can be corrected in a linear shape, as shown in FIG. 19(*c*).

Meanwhile, a request to flatten the CRT is being strengthened by being affected by a recent FPD (Flat Panel Display) represented by an LCD (Liquid Crystal Display) and a PDP (Plasma Display Panel).

When the CRT is flattened, however, an NS pincushion distortion and an EW pincushion distortion are increased. The shape of the pincushion distortion on the CRT having a normal deflection angle exhibits parabolic waveform characteristics (second power (square) characteristics). However, a higher-order distortion component is generated in the pincushion distortion on the CRT having a large deflection angle such as the flattened CRT. Particularly with respect to the NS pincushion distortion, transverse lines in the horizontal direction are in a pincushion shape, causing a so-called gull-wing distortion which deviates from simple parabolic waveform characteristics (square characteristics).

FIG. 20 is a conceptual diagram for explaining the generation of a gull-wing distortion, where FIG. 20(*a*) illustrates an NS pincushion distortion at the time of uncorrection on a screen of a CRT, FIG. 20(*b*) illustrates a correction waveform, and FIG. 20(*c*) illustrates the screen of the CRT at the time of correction.

When the NS pincushion distortion shown in FIG. 20(*a*) is corrected using the parabolic correction waveform shown in FIG. 20(*b*), a gull-wing distortion having a high-order distortion component shown in FIG. 20(*c*) is generated.

FIG. 21 is a diagram showing a second power (square) waveform and a waveform having a higher-order distortion component in normalized manner. The gull-wing distortion is the difference, between the second power waveform shown in FIG. 21 and the waveform having a higher-order distortion component, generated as a distortion on the screen of the CRT.

When the deflection angle of the CRT is thus increased, the NS pincushion distortion cannot be corrected using a horizontal parabolic current having the second power (square) waveform.

A harmonic component of the horizontal parabolic current (a second power component) can be also added to a vertical deflection current. However, the inductance of a winding of the vertical deflection coil is on the order of several mH, and the resistance component of the winding of the vertical deflection coil is on the order of several ten ohms. Accordingly, the vertical deflection coil itself operates as a low-pass filter with respect to a component having a frequency which is not less than the horizontal scanning frequency. When it is considered that the harmonic component of the horizontal parabolic current is added, therefore, a harmonic component which is significantly larger than a basic horizontal parabolic current must be added to the vertical deflection current, thereby causing the necessity of widening the dynamic range of a circuit.

Furthermore, in the correction of the NS pincushion distortion using the conventional supersaturated reactor system, the horizontal parabolic current derived from of the horizontal deflection current is utilized. Accordingly, the horizontal parabolic current also flows in the vertical blanking interval, so that power consumption is high.

DISCLOSURE OF INVENTION

An object of the present invention is to provide a vertical deflection apparatus capable of sufficiently correcting a north-south pincushion distortion without being affected by crosstalk from a horizontal deflection coil to a vertical deflection coil.

Another object of the present invention is to provide a vertical deflection apparatus capable of sufficiently correcting an asymmetrical north-south pincushion distortion.

Still another object of the present invention is to provide a vertical deflection apparatus capable of sufficiently correcting a north-south pincushion distortion even when the deflection angle thereof is large.

A vertical deflection apparatus according to an aspect of the present invention is a vertical deflection apparatus for supplying a vertical deflection current to a vertical deflection coil to deflect an electron beam in the vertical direction of a screen, which comprises a vertical deflection current output circuit that outputs the vertical deflection current to the vertical deflection coil; a correction circuit that outputs a correction signal periodically changing in a parabolic shape in a horizontal scanning period to correct a north-south pincushion distortion; a modulation circuit that modulates the phase of the correction signal output from the correction circuit in a vertical scanning period; and a superimposition device that superimposes a correction current based on an output signal of the modulation circuit on the vertical deflection current.

In the vertical deflection apparatus according to the present invention, the vertical deflection current is output to the vertical deflection coil by the vertical deflection current output circuit. The correction signal changing in a parabolic shape in the horizontal scanning period is output to correct the north-south pincushion distortion by the correction circuit. Further, the phase of the correction signal output from the correction circuit is modulated in the vertical scanning period by the modulation circuit. The correction current based on the output signal of the modulation circuit is superimposed on the vertical deflection circuit by the superimposition device.

In this case, the phase of the correction signal is modulated in the vertical scanning period, so that the effect of a crosstalk component induced from a horizontal deflection coil to the vertical deflection coil is corrected. Consequently, the north-south pincushion distortion can be sufficiently corrected without being affected by crosstalk.

The modulation circuit may delay the phase of the correction signal in the first half of a vertical scanning interval, while advancing the phase of the correction signal in the latter half of the vertical scanning interval.

In this case, the crosstalk component is synthesized with the correction signal, whereby the phase of the correction signal is advanced in the first half of the vertical scanning interval, while being delayed in the latter half of the vertical scanning interval. Consequently, the effect of the crosstalk component can be corrected by delaying the phase of the correction signal in the first half of the vertical scanning interval, while advancing the phase of the correction signal in the latter half of the vertical scanning interval.

The correction circuit may have the function of shifting the phase at the peak of the correction signal from the middle of a horizontal scanning interval.

Consequently, an asymmetrical north-south pincushion distortion can be corrected without being affected by the crosstalk.

The correction circuit may comprise a folded waveform generator that generates a folded waveform changing in a sawtooth shape in the horizontal scanning period and having a bending point at a level which is half the amplitude thereof, a turn-up waveform generator that generates a turn-up waveform obtained by turning up a portion below the level which is half the amplitude thereof in the folded waveform generated by the folded waveform generator at the bending point, and a correction signal generator that generates the correction signal having a peak corresponding to a turn-up point of the turn-up waveform generated by the turn-up waveform generator.

In this case, the position at the peak of the correction signal can be adjusted by adjusting the position at the bending point of the folded waveform. Consequently, the phase at the peak of the correction signal can be shifted from the middle of the horizontal scanning interval.

The correction signal generator may generate the correction signal by raising the turn-up waveform to the n-th power, where the n may be a real number.

Consequently, the parabolic correction signal having the peak corresponding to the turn-up point is obtained. In this case, a higher-order distortion component generated in the north-south pincushion distortion can be corrected by adjusting the value of n. Even when the deflection angle is large, therefore, a gull-wing distortion is prevented from being generated without being affected by the crosstalk, thereby making it possible to sufficiently correct the north-south pincushion distortion.

The correction circuit may output the correction signal by a combination of a parabolic waveform changing in the horizontal scanning period and another function waveform.

In this case, the higher-order distortion component generated in the north-south pincushion distortion can be corrected by a combination of the parabolic waveform and another function waveform. Even when the deflection angle is large, therefore, the gull-wing distortion is prevented from being generated without being affected by the crosstalk, thereby making it possible to sufficiently correct the north-south pincushion distortion.

The vertical deflection apparatus may further comprise a plurality of pulse generation circuits that respectively generate pulse signals in the horizontal scanning period, and a synthesizer that synthesizes the pulse signals respectively generated by the plurality of pulse generation circuits with the correction signal output from the correction circuit. The superimposition device may superimpose a correction current based on an output signal of the synthesizer on the vertical deflection current.

In this case, a pulse component corresponding to the pulse signal in the correction current superimposed on the vertical deflection current is integrated by the vertical deflection coil. Consequently, the higher-order distortion component generated in the north-south pincushion distortion is corrected by the integrated pulse component. Even when the deflection angle is large, therefore, the gull-wing distortion is prevented from being generated without being affected by the crosstalk, thereby making it possible to sufficiently correct the north-south pincushion distortion.

The vertical deflection apparatus may further comprise a blanking circuit that sets the correction current to zero in a vertical blanking interval.

In this case, the correction current becomes zero in the vertical blanking interval, thereby achieving power saving.

A vertical deflection apparatus according to another aspect of the present invention is a vertical deflection apparatus for supplying a vertical deflection current to a vertical deflection coil to deflect an electron beam in the vertical direction of a screen, which comprises a vertical deflection current output circuit that outputs the vertical deflection current to the vertical deflection coil; a correction circuit that outputs a correction signal periodically changng in a parabolic shape in a horizontal scanning period to correct a north-south pincushion distortion; and a superimposition device that superimposes a correction current based on the correction signal output from the correction circuit on the vertical deflection current, the correction circuit having the function of shifting the phase at the peak of the correction signal from the middle of a horizontal scanning interval.

In the vertical deflection apparatus according to the present invention, the vertical deflection current is output to the vertical deflection coil by the vertical deflection current output circuit. The correction signal changing in a parabolic shape in the horizontal scanning period is output to correct the north-south pincushion distortion by the correction circuit. Further, the correction current based on the correction signal output from the correction circuit is superimposed on the vertical deflection current by the superimposition device.

In this case, the correction circuit has the function of shifting the phase at the peak of the correction signal from the middle of the horizontal scanning interval, thereby making it possible to sufficiently correct an asymmetrical north-south pincushion distortion.

The correction circuit may comprise a folded waveform generator that generates a folded waveform changing in a sawtooth shape in the horizontal scanning period and having a bending point at a level which is half the amplitude thereof, a turn-up waveform generator that generates a turn-up waveform obtained by turning up a portion below the level which is half the amplitude thereof in the folded waveform generated by the folded waveform generator at the bending point, and a correction signal generator that generates the correction signal having a peak corresponding to a turn-up point of the turn-up waveform generated by the turn-up waveform generator.

In this case, the position at the peak of the correction signal can be adjusted by adjusting the position at the bending point of the folded waveform. Consequently, the phase at the peak of the correction signal can be shifted from the middle of the horizontal scanning interval.

The correction signal generator may generate the correction signal by raising the turn-up waveform to the n-th power, where the n may be a real number.

Consequently, the parabolic correction signal having the peak corresponding to the turn-up point is obtained. In this case, a higher-order distortion component generated in the north-south pincushion distortion can be corrected by adjusting the value of n. Even when the deflection angle is large, therefore, a gull-wing distortion is prevented from being generated without being affected by crosstalk, thereby making it possible to sufficiently correct the north-south pincushion distortion.

The correction circuit may output the correction signal by a combination of a parabolic waveform changing in the horizontal scanning period and another function waveform.

In this case, the higher-order distortion component generated in the north-south pincushion distortion can be corrected by the combination of the parabolic waveform and another function waveform. Even when the deflection angle is large, therefore, the gull-wing distortion is prevented from being generated without being affected by the crosstalk, thereby making it possible to sufficiently correct the north-south pincushion distortion.

The vertical deflection apparatus may further comprise a plurality of pulse generation circuits that respectively generate pulse signals in the horizontal scanning period, and a synthesizer that synthesizes the pulse signals respectively generated by the plurality of pulse generation circuits with the correction signal output from the correction circuit. The superimposition device may superimpose a correction current based on an output signal of the synthesizer on the vertical deflection current.

In this case, a pulse component corresponding to the pulse signal in the correction current superimposed on the vertical deflection current is integrated by the vertical deflection coil. Consequently, the higher-order distortion component generated in the north-south pincushion distortion is corrected by the integrated pulse component. Even when the deflection angle is large, therefore, the gull-wing distortion is prevented from being generated without being affected by the crosstalk, thereby making it possible to sufficiently correct the north-south pincushion distortion.

The vertical deflection apparatus may further comprise a blanking circuit that sets the correction current to zero in a vertical blanking interval.

In this case, the correction current becomes zero in the vertical blanking interval, thereby achieving power saving.

A vertical deflection apparatus according to still another aspect of the present invention is a vertical deflection apparatus for supplying a vertical deflection current to a vertical deflection coil to deflect an electron beam in the vertical direction of a screen, which comprises a vertical deflection current output circuit that outputs the vertical deflection current to the vertical deflection coil; a correction circuit that outputs a correction signal periodically changing in a parabolic shape in a horizontal scanning period to correct a north-south pincushion distortion; and a superimposition device that superimposes a correction current based on the correction signal output from the correction circuit on the vertical deflection current, the correction circuit outputting the correction signal by a combination of a parabolic waveform changing in the horizontal scanning period and another function waveform.

In the vertical deflection apparatus according to the present invention, the vertical deflection current is output to the vertical deflection coil by the vertical deflection current output circuit. The correction signal changing in a parabolic shape in the horizontal scanning period is output to correct a north-south pincushion distortion by the correction circuit. Further, the correction current based on the correction signal output from the correction circuit is superimposed on the vertical deflection current by the superimposition device.

In this case, a higher-order distortion component generated in the north-south pincushion distortion can be corrected by the combination of the parabolic waveform and another function waveform. Even when the deflection angle is large, therefore, the gull-wing distortion is prevented from being generated without being affected by crosstalk, thereby making it possible to sufficiently correct the north-south pincushion distortion.

Another function waveform maybe an n-th power waveform, where the n may be a real number.

In this case, the higher-order distortion component generated in the north-south pincushion distortion can be corrected by the combination of the parabolic waveform and the n-th power waveform.

The correction circuit may output the correction signal on the basis of a function expressed by the following equation (1), where n1, n2, . . . , nk may be respectively positive real numbers, and $A_{n1}$, $A_{n1}$, . . . , $A_{nk}$ may be respectively coefficients:

$$Y = A_{n1}X^{n1} + A_{n2}X^{n2} + \ldots + A_{nk}X^{nk} \qquad (1)$$

In this case, the higher-order distortion component generated in the north-south pincushion distortion can be corrected by arbitrarily setting the coefficients $A_{n1}$, $A_{n2}$, . . . , $A_{nk}$.

The another function waveform may be a sine waveform.

In this case, the higher-order distortion component generated in the north-south pincushion distortion can be corrected by the combination of the parabolic waveform and the sine waveform.

The sine waveform may have a period which is a/b times the horizontal scanning period and have a variable phase, where the a and b may be integers.

In this case, the higher-order distortion component generated in the north-south pincushion distortion can be corrected by arbitrarily setting the coefficient a, the coefficient b, and the phase, respectively.

The vertical deflection apparatus may further comprise a blanking circuit for setting the correction current to zero in a vertical blanking interval.

In this case, the correction current becomes zero in the vertical blanking interval, thereby achieving power saving.

A vertical deflection apparatus according to a further aspect of the present invention is a vertical deflection apparatus for supplying a vertical deflection current to a vertical deflection coil to deflect an electron beam in the vertical direction of a screen, which comprises a vertical deflection current output circuit that outputs the vertical deflection current to the vertical deflection coil; a correction circuit that outputs a correction signal for correcting a north-south pincushion distortion; a plurality of pulse generation circuits that respectively generate pulse signals in a horizontal scanning period; a synthesizer that synthesizes the pulse signals respectively generated by the plurality of pulse generation circuits with the correction signal output from the correction circuit; and a superimposition device that superimposes a correction current based on an output signal of the synthesizer on the vertical deflection current.

In the vertical deflection apparatus according to the present invention, the vertical deflection current is output to the vertical deflection coil by the vertical deflection current output circuit. The correction signal for correcting a north-south pincushion distortion is output from the correction circuit. Further, the pulse signals are respectively generated in the horizontal scanning period by the plurality of pulse generation circuits. The pulse signals respectively generated by the plurality of pulse generation circuits are synthesized with the correction signal output from the correction circuit by the synthesizer. The correction current based on the output signal of the synthesizer is superimposed on the vertical deflection current by the superimposition device.

In this case, a pulse component corresponding to the pulse signal in the correction current superimposed on the vertical deflection current is integrated by the vertical deflection coil. Consequently, a higher-order distortion component generated in the north-south pincushion distortion is corrected by the integrated pulse component. Even when the deflection angle is large, therefore, a gull-wing distortion is prevented from being generated, thereby making it possible to sufficiently correct the north-south pincushion distortion.

The superimposition device may comprise a transformer having a primary winding and a secondary winding, and a drive circuit connected to the primary winding of the transformer, the secondary winding of the transformer may be connected in series with the vertical deflection coil, and the drive circuit may supply a drive current to the primary winding of the transformer in response to the output signal of the synthesizer.

In this case, the drive current is supplied to the primary winding of the transformer in response to the output signal of the synthesizer by the drive circuit. Consequently, the correction current based on the output signal of the synthesizer is superimposed on the vertical deflection current. The correction current can be easily superimposed on the vertical deflection current.

The vertical deflection apparatus may be so constructed that the plurality of pulse generation circuits can respectively control the pulse height values of the pulse signals independently.

Consequently, higher-order distortion components of various sizes in the north-south pincushion distortion can be corrected.

The vertical deflection apparatus may be so constructed that the plurality of pulse generation circuits can respectively control the phases or the pulse widths of the pulse signals independently.

Consequently, higher-order distortion components having various phases or widths in the north-south pincushion distortion can be corrected.

The vertical deflection apparatus may be so constructed that the plurality of pulse generation circuits can respectively control the polarities of the pulse signals independently.

Consequently, higher-order distortion components having various polarities in the north-south pincushion distortion can be corrected.

The vertical deflection apparatus may further comprise a first modulation circuit that modulates the pulse height value of the correction signal output from the correction circuit in a vertical scanning period, and a second modulation circuit that modulates the pulse height values of the pulse signals respectively output from the plurality of pulse signal generation circuits in the vertical scanning period.

In this case, the pulse height value of the correction signal output from the correction circuit is modulated in the vertical scanning period by the first modulation circuit, and the pulse height values of the pulse signals respectively output from the plurality of pulse signal generation circuits are modulated in the vertical scanning period by the second modulation circuit. Consequently, it is possible to correct a suitable amount of correction in each of portions on the screen.

The synthesizer may comprise an adder that adds the pulse signals respectively generated by the plurality of pulse generation circuits to the correction signal output from the correction circuit.

In this case, the correction signal output from the correction circuit and the pulse signals respectively generated by the plurality of pulse signal generation circuits are added together by the adder, so that the pulse signals and the correction signal are synthesized.

The vertical deflection apparatus may further comprise a blanking circuit that sets the correction current to zero in a vertical blanking interval.

In this case, the correction current becomes zero in the vertical blanking interval, thereby achieving power saving.

BRIEF DESCRIPTION OF DRAWINGS

FIG. 13 is a waveform diagram for explaining the correction of an NS pincushion distortion in the vertical deflection apparatus shown in FIG. 12.

FIG. 18 is a diagram for explaining HV crosstalk.

FIG. 19 is a conceptual diagram for explaining the correction of an NS pincushion distortion.

FIG. 20 is a conceptual diagram for explaining the generation of a gull-wing distortion.

FIG. 21 is a diagram showing a square waveform and a waveform having a higher-order distortion component in normalized fashion.

BEST MODE FOR CARRYING OUT THE INVENTION

Figure 1:
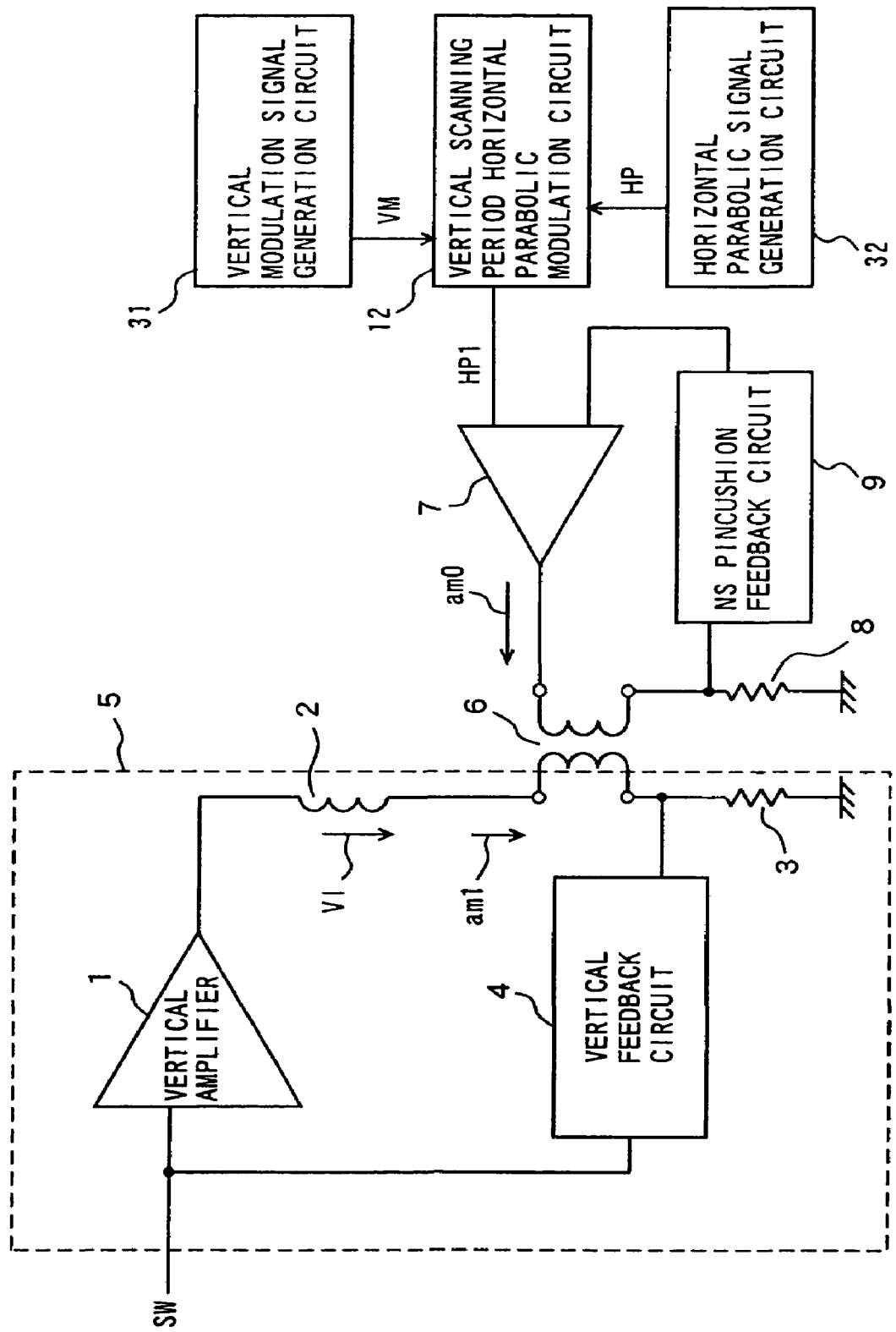
FIG. 1 is a block diagram showing the configuration of a vertical deflection apparatus in a first embodiment of the present invention.

Embodiments of the present invention will be described while referring to the drawings.

(1) First Embodiment

Figure 2:
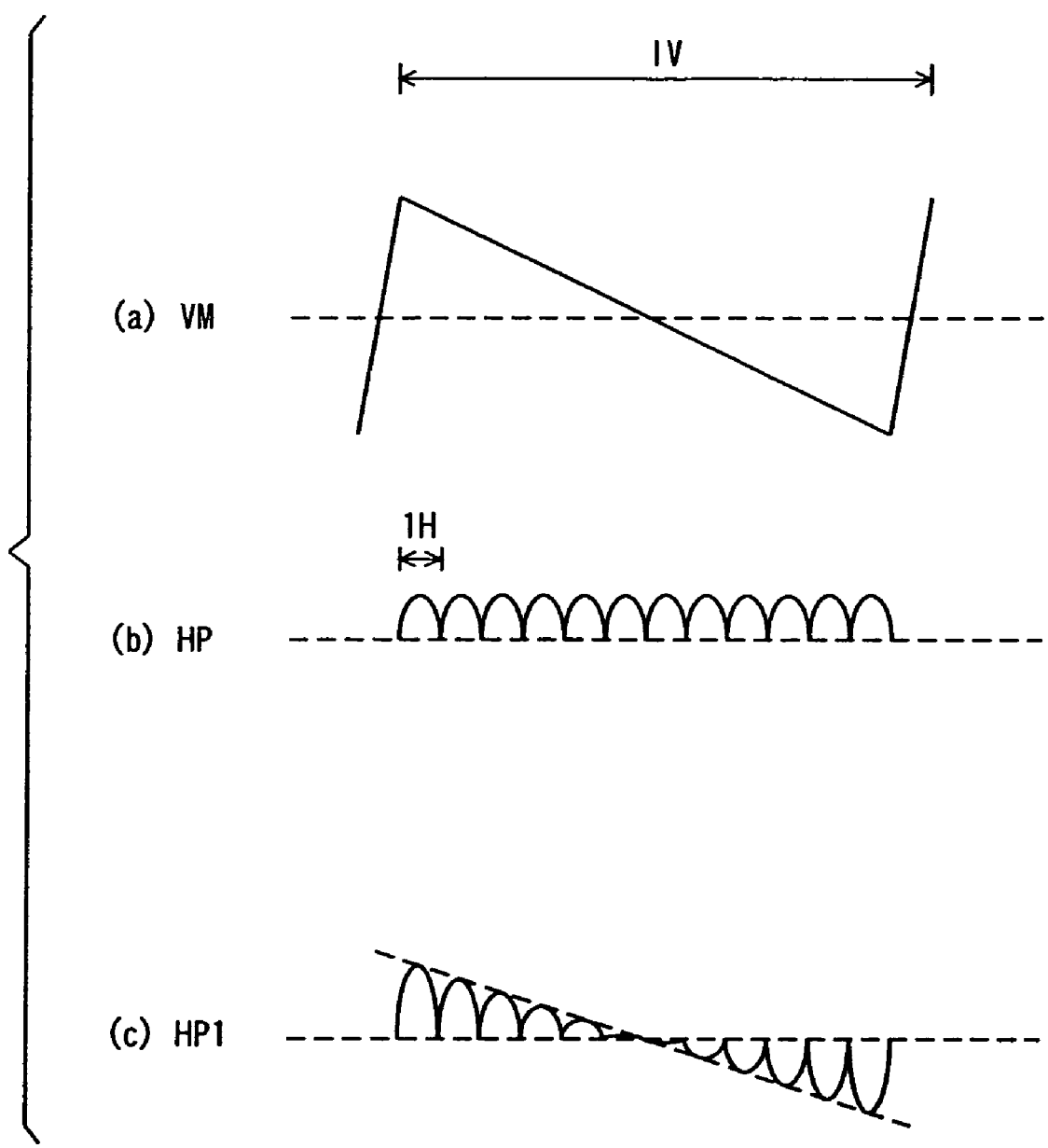
FIG. 2 is a waveform diagram showing signals of respective units in the vertical deflection apparatus shown in FIG. 1.

FIG. 1 is a block diagram showing the configuration of a vertical deflection apparatus in a first embodiment of the present invention. FIG. 2 is a waveform diagram showing signals of respective units in the vertical deflection apparatus shown in FIG. 1. In FIG. 2, V indicates a vertical scanning period, and H indicates a horizontal scanning period.

In the vertical deflection apparatus shown in FIG. 1, a vertical amplifier 1, a vertical deflection coil 2, a vertical current detection resistor 3, a vertical feedback circuit 4, and a secondary winding of a transformer 6 constitute a vertical output circuit 5. A sawtooth voltage SW, which changes in the vertical scanning period, is fed to an input terminal of the vertical amplifier 1. The vertical deflection coil 2, the secondary winding of the transformer 6, and the vertical current detection resistor 3 are connected in series between an output terminal of the vertical amplifier 1 and a ground terminal. A node of the secondary winding of the transformer 6 and the vertical current detection resistor 3 is connected to the input terminal of the vertical amplifier 1 through the vertical feedback circuit 4.

An output terminal of a correction current output amplifier 7 is connected to one end of the primary winding of the transformer 6. The other end of the primary winding of the transformer 6 is connected to the ground terminal through a correction current detection resistor 8. A modulated horizontal parabolic signal HP1, described later, is fed to one input terminal of the correction current output amplifier 7. A node of the other end of the primary winding of the transformer 6 and the correction current detection resistor 8 is connected to the other input terminal of the correction current output amplifier 7 through an NS pincushion distortion feedback circuit 9.

A vertical modulation signal generation circuit 31 generates a vertical modulation signal (vertical modulation voltage) VM. As shown in FIG. 2(a), the vertical modulation signal VM changes in a sawtooth shape in the vertical scanning period. A horizontal parabolic signal generation circuit 32 generates a horizontal parabolic signal (horizontal parabolic voltage) HP. As shown in FIG. 2(b), the horizontal parabolic signal HP changes in a parabolic shape in the horizontal scanning period.

The vertical modulation signal VM generated by the vertical modulation signal generation circuit 31 and the horizontal parabolic signal HP generated by the horizontal parabolic signal generation circuit 32 are fed to a vertical scanning period horizontal parabolic modulation circuit (hereinafter abbreviated as a parabolic modulation circuit) 12. The parabolic modulation circuit 12 multiplies the horizontal parabolic signal HP and the vertical modulation signal VM together, to amplitude-modulate the horizontal parabolic signal HP using the vertical modulation signal VM, and modulates the phase of the horizontal parabolic signal HP on the basis of the vertical modulation signal VM, so as to output the modulated horizontal parabolic signal HP1 to the one input terminal of the correction current output amplifier 7. As shown in FIG. 2(c), in the first half of a vertical scanning interval, the polarity of the horizontal parabolic signal HP1 is not reversed, and the amplitude of the horizontal parabolic signal HP1 is gradually reduced in accordance with the level of the vertical modulation signal VM. In the latter half of the vertical scanning interval, the polarity of the horizontal parabolic signal HP1 is reversed, and the amplitude of the horizontal parabolic signal HP1 is gradually increased in accordance with the level of the vertical modulation signal VM.

Figure 3:
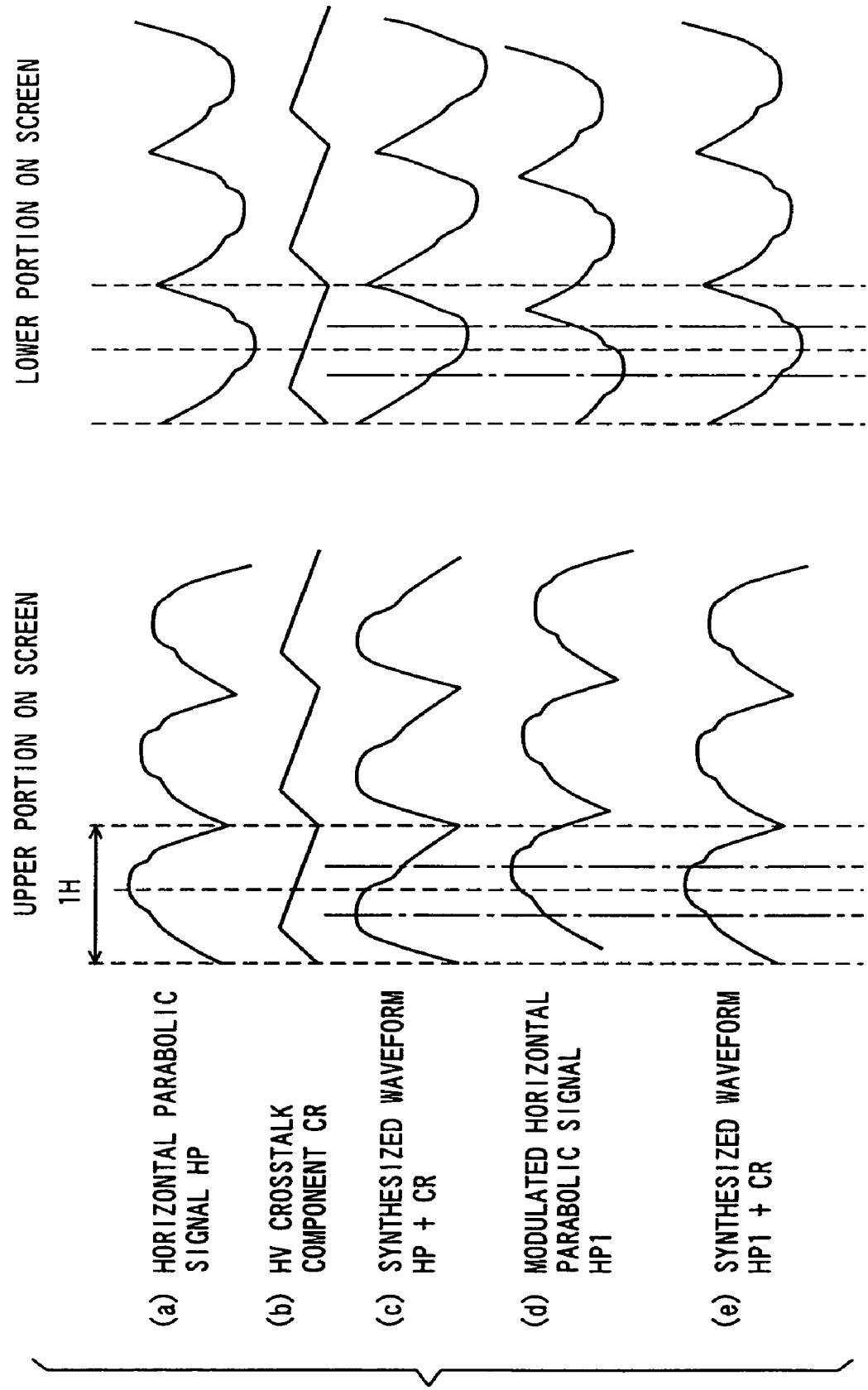
FIG. 3 is a diagram for explaining the correction of an NS pincushion distortion in the vertical deflection apparatus shown in FIG. 1.

FIG. 3 is a waveform diagram for explaining the correction of an NS pincushion distortion in the vertical deflection apparatus shown in FIG. 1.

FIG. 3(a) illustrates the horizontal parabolic signal HP output from the horizontal parabolic signal generation circuit 32, FIG. 3(b) illustrates a current (an HV crosstalk component) CR induced in the vertical deflection coil from a horizontal deflection coil, FIG. 3(c) illustrates a synthesized waveform of the horizontal parabolic signal HP shown in FIG. 3(a) and the HV crosstalk component CR shown in FIG. 3(b), FIG. 3(d) illustrates the horizontal parabolic signal HP1 modulated by the parabolic modulation circuit 12, and FIG. 3(e) illustrates a synthesized waveform of the horizontal parabolic signal HP1 shown in FIG. 3(d) and the HV crosstalk component CR shown in FIG. 3(c).

As shown in FIG. 3(a), the horizontal parabolic signal HP, which changes in the horizontal scanning period, is output from the horizontal parabolic signal generation circuit 32. As shown in FIG. 3(b), the HV crosstalk component CR changes in the horizontal scanning period.

The horizontal parabolic signal HP shown in FIG. 3(a) and the HV crosstalk component CR shown in FIG. 3(b) are synthesized (added). Consequently, the phase of the synthesized waveform is advanced within the horizontal scanning internal in an upper portion on a screen, while being delayed within the horizontal scanning internal in a lower portion on the screen, as shown in FIG. 3(c). That is, the peak of the synthesized waveform is shifted to the left in the horizontal direction in the upper portion on the screen, while being shifted to the right in the horizontal direction in the lower portion on the screen.

The parabolic modulation circuit 12 shown in FIG. 1 delays the phase of the horizontal parabolic signal HP in the upper portion on the screen, while advancing the phase of the horizontal parabolic signal HP in the lower portion on the screen. Consequently, the peak of the modulated horizontal parabolic signal HP1 is shifted to the right in the horizontal direction in the upper portion on the screen, while being shifted to the left in the horizontal direction in the lower portion on the screen, as shown in FIG. 3(*d*).

The horizontal parabolic signal HP1 shown in FIG. 3(*d*) and the HV crosstalk component CR shown in FIG. 3(*b*) are synthesized (added). Consequently, the peak of the synthesized waveform is positioned at the center in the horizontal direction in the upper portion and the lower portion on the screen, as shown in FIG. 3(*e*).

In such a way, the corrected horizontal parabolic signal HP1 is output from the parabolic modulation circuit 12. The horizontal parabolic signal HP1 output from the parabolic modulation circuit 12 is amplified by the correction current output amplifier 7, so that correction current am0 output from the correction current output amplifier 7 flows through the primary winding of the transformer 6.

The vertical amplifier 1 outputs a sawtooth vertical deflection current VI which changes in the vertical scanning period in response to the sawtooth voltage SW which changes in the vertical scanning period. A correction current am1 is obtained in the secondary winding by the current flowing through the primary winding of the transformer 6. The correction current am1 changes in a parabolic shape in the horizontal scanning period, similarly to the synthesized waveform shown in FIG. 3(*e*). This correction current am1 is superimposed on the vertical deflection current VI output from the vertical amplifier 1. Consequently, the NS pincushion distortion is corrected without being affected by HV crosstalk.

Figure 4:
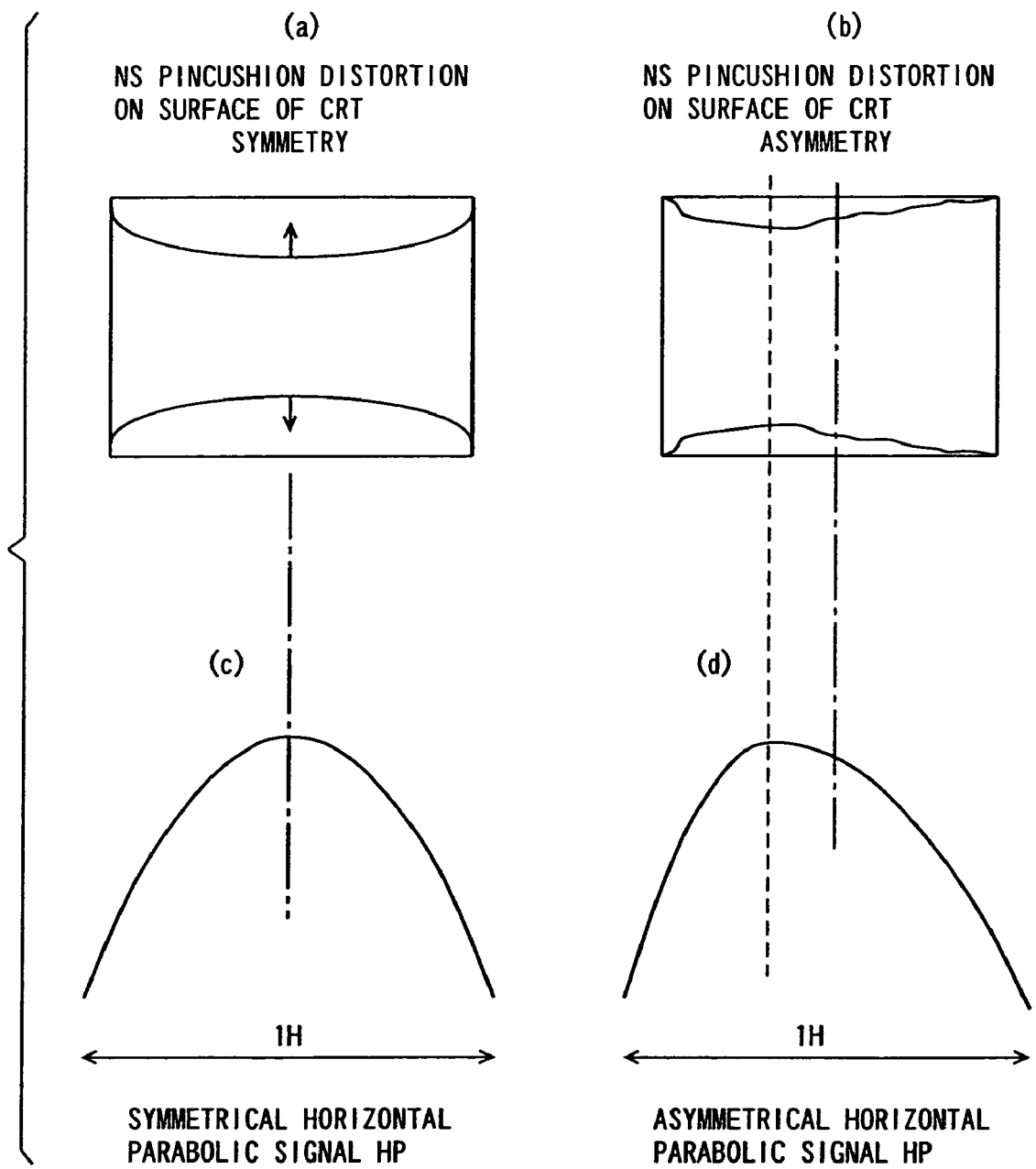
FIG. 4 is a diagram for explaining a horizontal parabolic signal in a case where an NS pincushion distortion is symmetrical on a screen and a horizontal parabolic signal in a case where an NS pincushion distortion is asymmetrical on a screen.

An NS pincushion distortion in a case where the distortion differs on the right and left sides in the horizontal direction of a screen of a CRT by a combination of the CRT and a deflection yoke will be described using FIG. 4. FIG. 4 is a diagram for explaining a horizontal parabolic signal in a case where the NS pincushion distortion is symmetrical on the screen and a horizontal parabolic signal in a case where the NS pincushion distortion is asymmetrical on the screen.

FIG. 4(*a*) illustrates transverse lines displayed on the screen of the CRT in a case where the NS pincushion distortion on the screen of the CRT is symmetrical by the combination of the CRT and the deflection yoke. When the NS pincushion distortion on the screen of the CRT is symmetrical, as shown in FIG. 4(*a*), the horizontal parabolic signal generation circuit 32 shown in FIG. 1 is set so as to generate a symmetrical horizontal parabolic signal HP, as shown in FIG. 4(*c*).

FIG. 4(*b*) illustrates transverse lines displayed on the screen of the CRT in a case where the NS pincushion distortion on the screen of the CRT is asymmetrical by the combination of the CRT and the deflection yoke. When the NS pincushion distortion on the screen of the CRT is asymmetrical, as shown in FIG. 4(*b*), the horizontal parabolic signal generation circuit 32 shown in FIG. 1 is set so as to generate an asymmetrical horizontal parabolic signal HP, as shown in FIG. 4(*d*).

Figure 5:
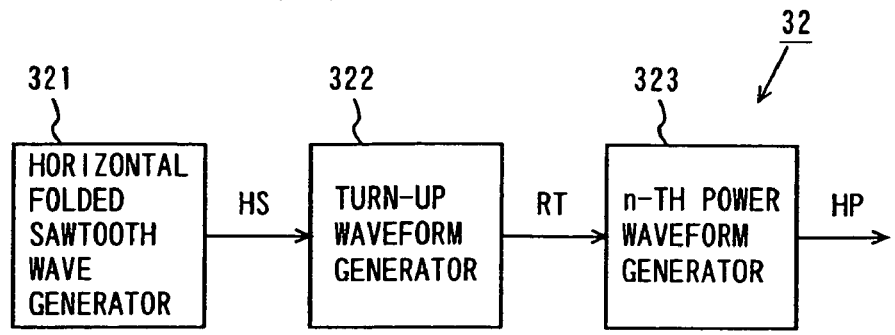
FIG. 5 is a block diagram showing an example of the configuration of a horizontal parabolic signal generation circuit.
Figure 6:
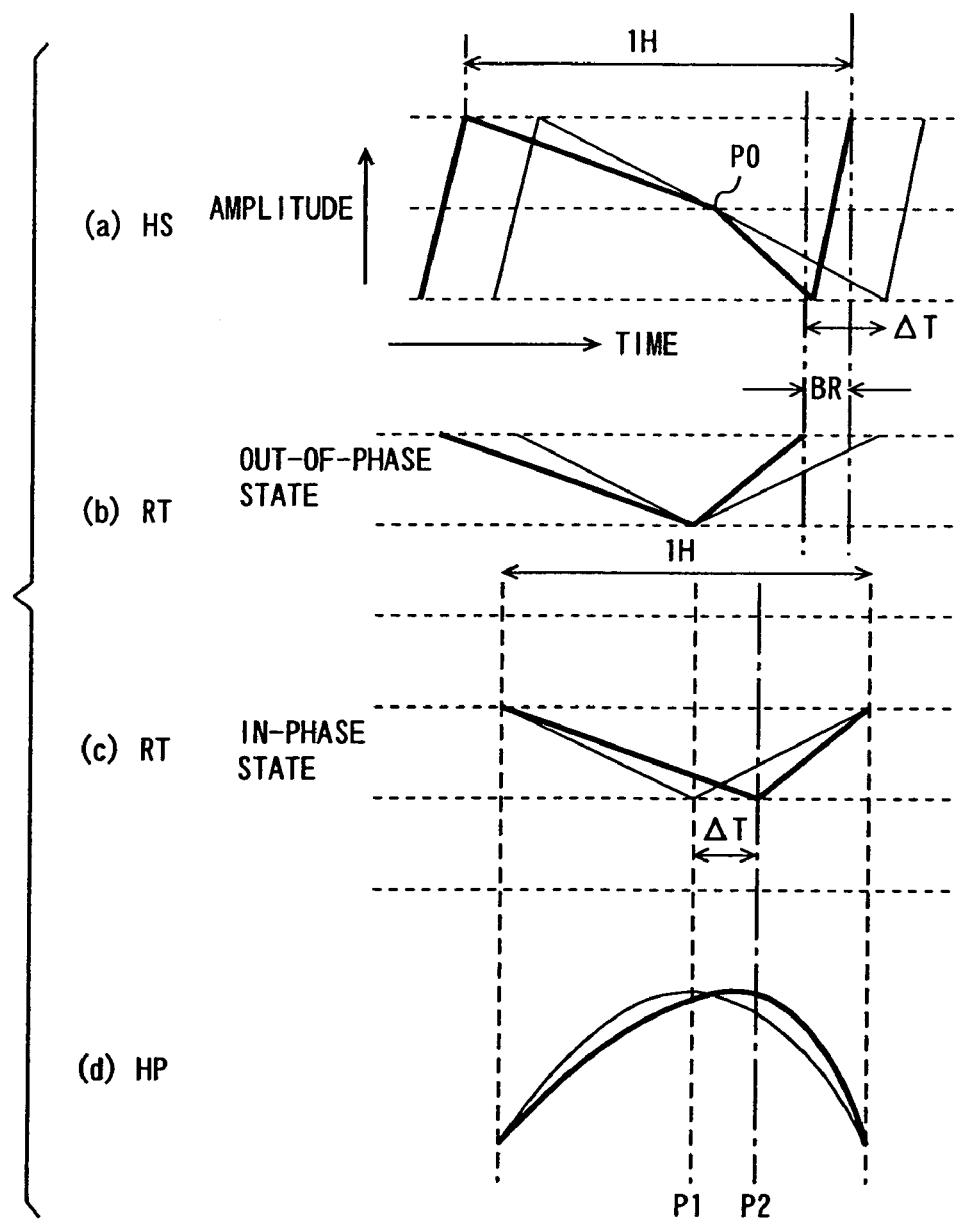
FIG. 6 is a waveform diagram for explaining the operations of the horizontal parabolic signal generation circuit shown in FIG. 5.

FIG. 5 is a block diagram showing an example of the configuration of the horizontal parabolic signal generation circuit 32. FIG. 6 is a waveform diagram for explaining the operations of the horizontal parabolic signal generation circuit 32 shown in FIG. 5. In FIG. 6(*a*), BR indicates a horizontal blanking interval. In FIGS. 6(*b*), 6(*c*), and 6 (*d*), the indication of the horizontal blanking interval is omitted.

As shown in FIG. 5, the horizontal parabolic signal generation circuit 32 comprises a horizontal folded sawtooth wave generator 321, a turn-up waveform generator 322, and an n-th power waveform generator 323. The horizontal folded sawtooth wave generator 321 generates a horizontal folded sawtooth wave HS which changes in the horizontal scanning period. The horizontal turn-up waveform generator 322 generates a horizontal turn-up waveform RT on the basis of the horizontal folded sawtooth wave HS. The n-th power generator 323 shifts the peak of an n-th power waveform on the basis of the horizontal turn-up waveform RT, to generate a horizontal parabolic signal HP.

As shown in FIG. 6(*a*), in the horizontal folded sawtooth wave HS generated by the horizontal folded sawtooth wave generator 321, a point PO at which the amplitude thereof is halved can be moved back and forth from the middle of a horizontal scanning interval. Consequently, the horizontal folded sawtooth wave HS is folded at the point PO at which the amplitude thereof is halved, so that periods before and after the point PO change. In FIG. 6(*a*), the horizontal folded sawtooth wave HS in a case where the point PO at which the amplitude thereof is halved deviates from the middle of the horizontal scanning interval is indicated by a thick line, and the horizontal folded sawtooth wave HS in a case where the point PO at which the amplitude thereof is halved is positioned at the middle of the horizontal scanning interval is indicated by a thin line. Although in FIG. 6(*a*), the horizontal folded sawtooth wave HS indicated by the thin line is $\Delta T$ out of phase with the horizontal folded sawtooth wave HS indicated by the thick line in order to emphasize that the horizontal folded sawtooth wave HS is folded at the point PO at which the amplitude thereof is halved, the horizontal folded sawtooth wave HS indicated by the thin line is actually in phase with the horizontal folded sawtooth wave HS indicated by the thick line.

As shown in FIG. 6(*b*), a latter half portion of the turn-up waveform RT generated by the turn-up waveform generator 322 is turned upward at the point PO at which the amplitude thereof is halved. Also in FIG. 6(*b*), the turn-up waveform RT indicated by the thin line is $\Delta T$ out of phase with the turn-up waveform RT indicated by the thick line in order to emphasize that the turn-up waveform RT is turned up the point at which the amplitude thereof is halved. Actually, as shown in FIG. 6(*c*), the turn-up waveform RT indicated by the thin line is in phase with the turn-up waveform RT indicated by the thick line, and a turn-up point of the turn-up waveform RT indicated by the thin line is $\Delta T$ out of phase with a turn-up point of the turn-up waveform RT indicated by the thick line.

The horizontal turn-up waveform RT is raised to the n-th power by the n-th power waveform generator 323, thereby generating the horizontal parabolic signal HP. As shown in FIG. 6(*d*), a phase P2 at the peak of the horizontal parabolic signal HP indicated by the thick line is shifted by $\Delta T$ from a phase P1 at the peak of the horizontal parabolic signal HP indicated by the thin line.

n in the n-th power generator 323 is a positive real number. When a gull-wing distortion, described later, is not generated, n in the n-th power generator 323 is set to two.

In such a way, the asymmetrical horizontal parabolic signal HP shown in FIG. 4(*d*) can be generated by the horizontal parabolic signal generation circuit 32. Consequently, it is possible to correct the NS pincushion distortion, which is asymmetrical on the screen, generated by the combination of the CRT and the deflection yoke.

The correction of a gull-wing distortion generated in a case where the deflection angle of the CRT is increased will be described using FIG. 7. The gull-wing distortion has no parabolic waveform, as shown in FIG. 20, so that the distortion cannot be corrected by the horizontal parabolic signal HP having a simple parabolic waveform.

Figure 7:
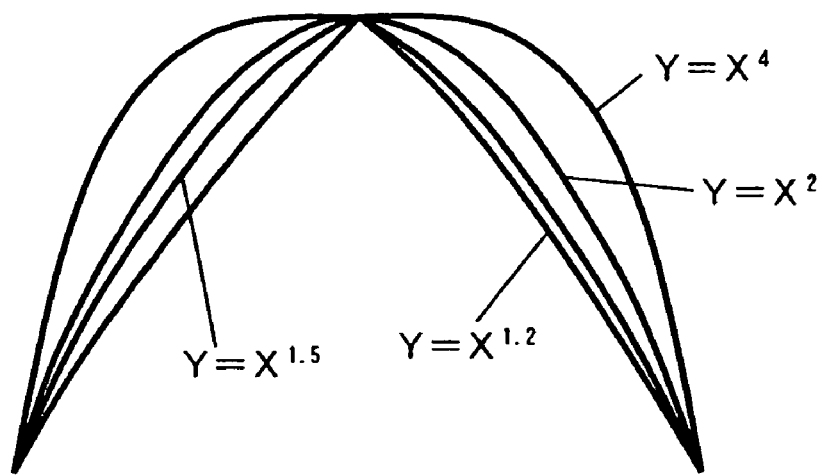
FIG. 7 is a waveform diagram showing an n-th power waveform used for correcting a gull-wing distortion.

FIG. 7 is a waveform diagram showing an n-th power waveform used for correcting the gull-wing distortion. In FIG. 7, the n-th power waveform is indicated by $Y=X^n$, and n-th power waveforms in cases where n=1.2, 1.5, 2, and 4 are illustrated. Here, Y is an amplitude of the waveform and X is a position in the horizontal direction.

When n in the n-th power waveform indicated by $Y=X^n$ is changed, as shown in FIG. 7, the amplitude is not changed at a position corresponding to half of one period, while being changed at positions respectively corresponding to one-fourth and three-fourths of one period. In a case where the length in the horizontal direction on the screen of the CRT is set to one, therefore, amounts of correction at the position corresponding to one-fourth and the position corresponding to three-fourths are changed depending on n. Consequently, the gull-wing distortion can be corrected by adjusting the value of n.

In the horizontal parabolic signal generation circuit 32 shown in FIG. 5, the gull-wing distortion can be corrected by adjusting the value of n in the n-th power waveform generator 323.

The gull-wing distortion may be corrected by combining a plurality of n-th power waveforms in the horizontal parabolic signal generation circuit 32. In this case, the waveform of the horizontal parabolic signal HP is expressed by the following equation:

$$Y = A_{n1}X^{n1} + A_{n2}X^{n2} + \ldots + A_{nk}X^{nk}$$

In the foregoing equation, n1, n2, ..., nk are respectively arbitrary positive real numbers, and $A_{n1}$, $A_{n2}$, ..., $A_{nk}$ are respectively arbitrary coefficients.

For example, the waveform of the horizontal parabolic signal HP may be set, as expressed by the following equation:

$$Y = AX^2 + BX^4$$

In the foregoing equation, A and B are respectively arbitrary coefficients. The gull-wing distortion can be corrected by adjusting the coefficients A and B in the horizontal parabolic signal generation circuit 32.

Figure 8:
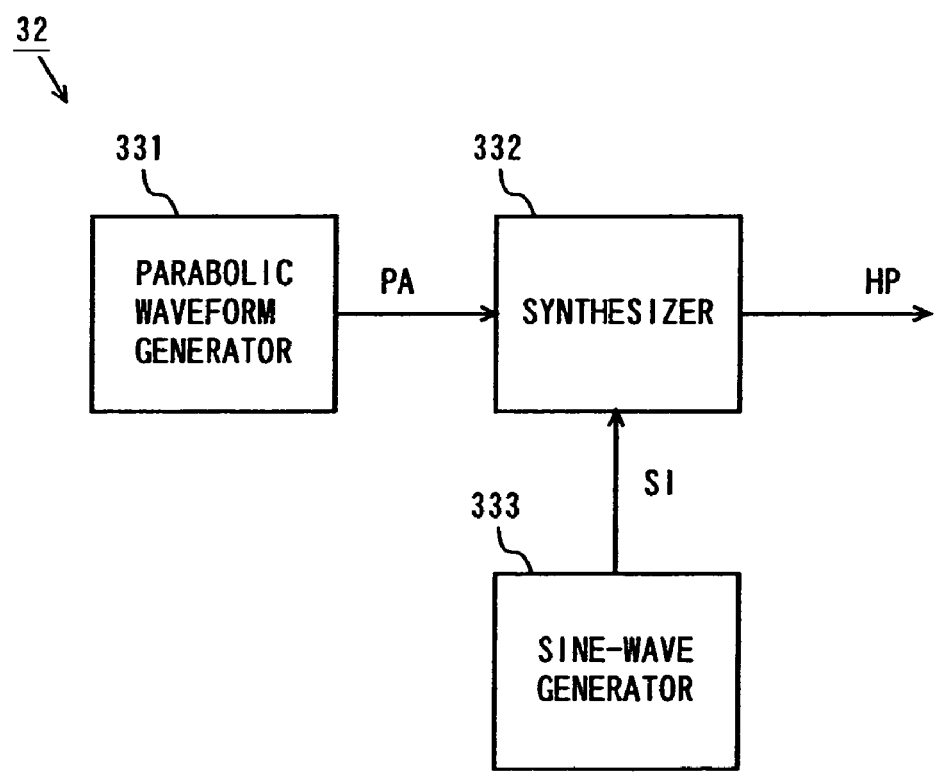
FIG. 8 is a block diagram showing another example of the configuration of a horizontal parabolic signal generation circuit.
Figure 9:
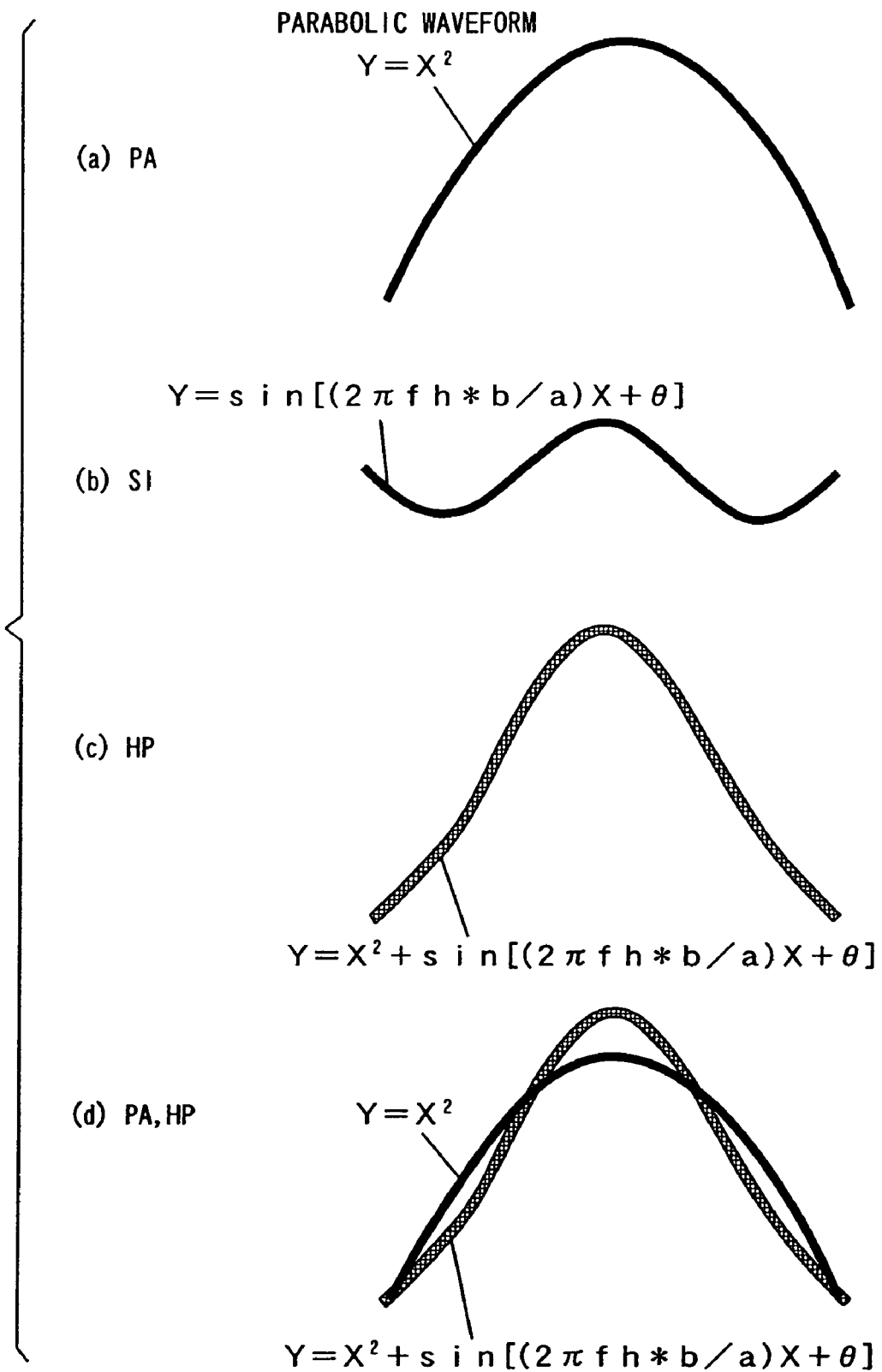
FIG. 9 is a waveform diagram for explaining the operations of the horizontal parabolic signal generation circuit shown in FIG. 8.

FIG. 8 is a block diagram showing another example of the configuration of the horizontal parabolic signal generation circuit 32. FIG. 9 is a waveform diagram for explaining the operations of the horizontal parabolic signal generation circuit 32 shown in FIG. 8.

As shown in FIG. 8, the horizontal parabolic signal generation circuit 32 comprises a parabolic waveform generator 331, a synthesizer 332, and a sine-wave generator 333. The parabolic waveform generator 331 generates a parabolic waveform PA which changes in the horizontal scanning period, similarly to the horizontal folded sawtooth wave generator 321, the turn-up waveform generator 322, and the n-th power waveform generator 323. The sine-wave generator 333 generates a sine wave SI which changes in the horizontal scanning period. The synthesizer 332 synthesizes the parabolic waveform PA generated by the parabolic waveform generator 331 and the sine wave SI generated by the sine-wave generator 333, to output a horizontal parabolic signal HP.

As shown in FIG. 9(a), the parabolic waveform PA generated by the parabolic waveform generator 331 is indicated by $Y=X^2$. As shown in FIG. 9(b), the sine wave SI generated by the sine-wave generator 333 is indicated by $Y=\sin[(2\pi fh \cdot b/a)X+\theta]$, where fh is a horizontal scanning frequency, and a and b are respectively arbitrary coefficients. For example, a/b=4/3. Further, θ is an adjustable phase. Consequently, the sine wave SI has a period which is a/b times the horizontal scanning period, and the phase θ is adjustable. It is preferable that the sine wave SI has a period which is two or more times the horizontal scanning period.

$Y=\sin[(2\pi fh \cdot b/a)X+\theta]$ is approximately equivalent to $Y=X^4$. As shown in FIG. 9(c), the horizontal parabolic signal HP output form the synthesizer 332 is expressed by $$Y = X^2 + \sin[(2\pi fh \cdot b/a)X + \theta].$$

FIG. 9(d) illustrates the parabolic waveform PA generated by the parabolic waveform generator 331 and the horizontal parabolic signal HP output from the synthesizer 332 by comparison. The sine wave SI is synthesized with (added to) the parabolic waveform PA, thereby making it possible to increase the amplitude at the peak position (the center) of the parabolic waveform and reduce the amplitude on both sides of the peak.

Consequently, the gull-wing distortion can be corrected by adjusting the coefficients a and b or the phase θ in the horizontal parabolic signal generation circuit 32.

As described in the foregoing, in the vertical deflection apparatus according to the present embodiment, it is possible to correct the NS pincushion distortion having a higher-order distortion component generated by the combination of the flattened CRT and the deflection yoke without being affected by the HV crosstalk. It is possible to also correct the asymmetrical NS distortion. Further, even when the deflection angle is large, the gull-wing distortion is prevented from being generated, thereby making it possible to sufficiently correct the generation of the NS pincushion distortion.

In this case, if the correction current detection resistor 8, the NS pincushion distortion feedback circuit 9, the parabolic modulation circuit 12, the vertical modulation signal generation circuit 31, the horizontal parabolic signal generation circuit 32, and so forth are constructed as an IC (Integrated Circuit), the NS pincushion distortion can be corrected only by such an IC, the transformer 6 and the correction current output amplifier 7, thereby making it possible to correct the NS pincushion distortion at low cost.

In the present embodiment, the vertical amplifier 1 corresponds to a vertical deflection current output circuit, the horizontal parabolic signal generation circuit 32 corresponds to a correction circuit, the parabolic modulation circuit 12 corresponds to a modulation circuit, and the transformer 6 and the correction current output amplifier 7 correspond to an superimposition device. Further, the horizontal folded sawtooth wave generator 321 corresponds to a folded waveform generator, the turn-up waveform generator 322 corresponds to a turn-up waveform generator, and the n-th power waveform generator 323 corresponds to a correction signal generator.

(2) Second Embodiment

Figure 10:
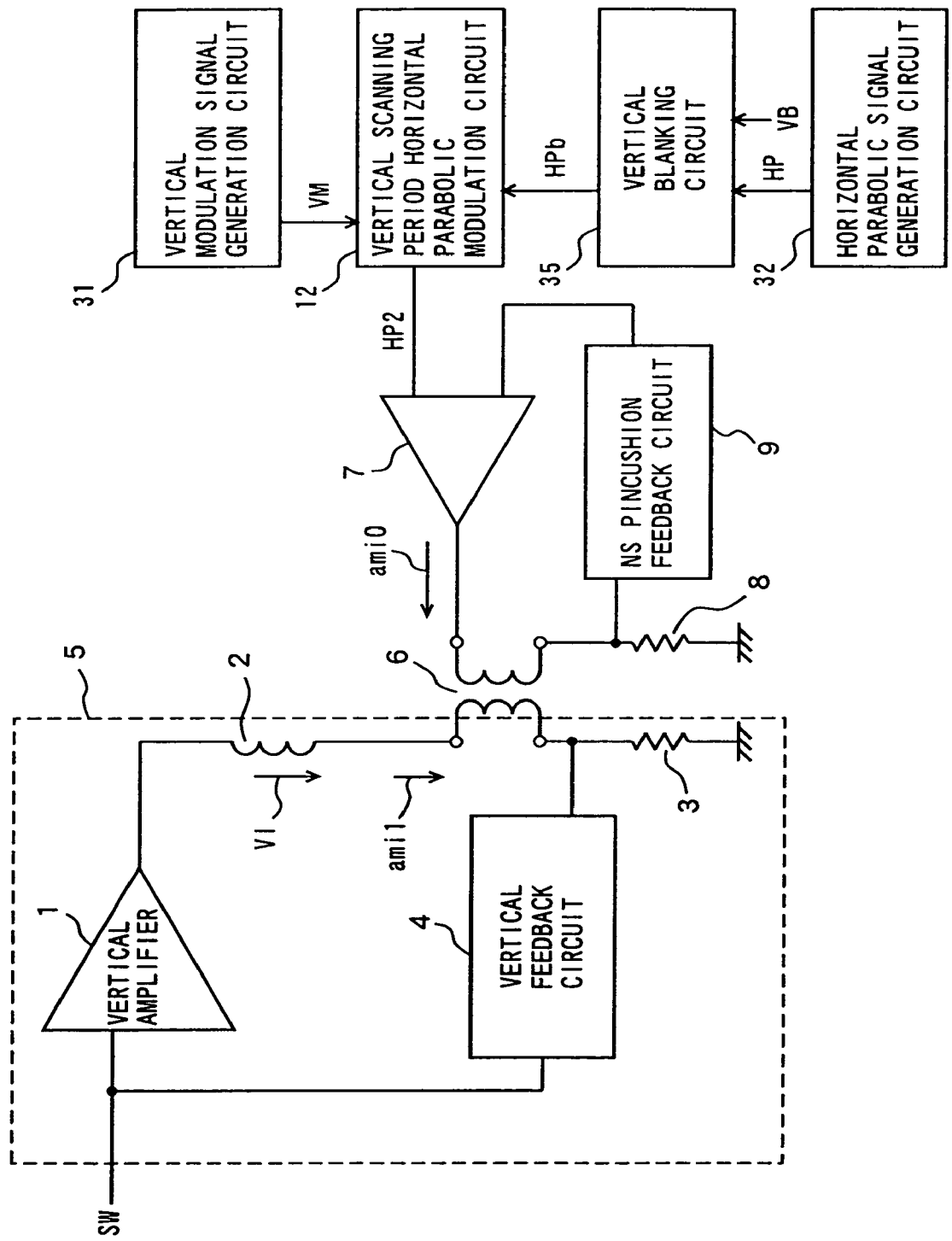
FIG. 10 is a block diagram showing the configuration of a vertical deflection apparatus in a second embodiment of the present invention.

FIG. 10 is a block diagram showing the configuration of a vertical deflection apparatus in a second embodiment of the present invention. The vertical deflection apparatus in the present embodiment has a configuration for power saving.

In the vertical deflection apparatus shown in FIG. 10, a vertical blanking circuit 35 is further added to the configuration of the vertical deflection apparatus shown in FIG. 1. The vertical blanking circuit 35 corresponds to a blanking circuit.

A vertical blanking signal VB and a horizontal parabolic signal HP from a horizontal parabolic signal generation circuit 32 are fed to the vertical blanking circuit 35. The vertical blanking circuit 35 sets the level of the horizontal parabolic signal HP in a vertical blanking interval to zero on the basis of the vertical blanking signal VB, to generate a horizontal parabolic signal HPb whose level in the vertical blanking interval is zero (hereinafter referred to as a vertically blanked horizontal parabolic signal). The vertically blanked horizontal parabolic signal HPb is output to a parabolic modulation circuit 12.

The parabolic modulation circuit 12 multiplies the vertically blanked horizontal parabolic signal HPb and a vertical modulation signal VM together, to amplitude-modulate the horizontal parabolic signal HPb using the vertical modulation signal VM, and modulates the phase of the horizontal parabolic signal HPb on the basis of the vertical modulation signal VM, so as to output a modulated horizontal parabolic signal HP2 to one input terminal of a correction current output amplifier 7.

The horizontal parabolic signal HP2 output from the parabolic modulation circuit 12 is amplified by the correction current output amplifier 7, so that a correction current ami0 output from the correction current output amplifier 7 flows through a primary winding of a transformer 6.

A correction current ami1 is obtained in a secondary winding by the current flowing through the primary winding of the transformer 6. The correction current ami1 is superimposed on a vertical deflection current VI output from a vertical amplifier 1. Consequently, an NS pincushion distortion is corrected without being affected by HV crosstalk.

Figure 11:
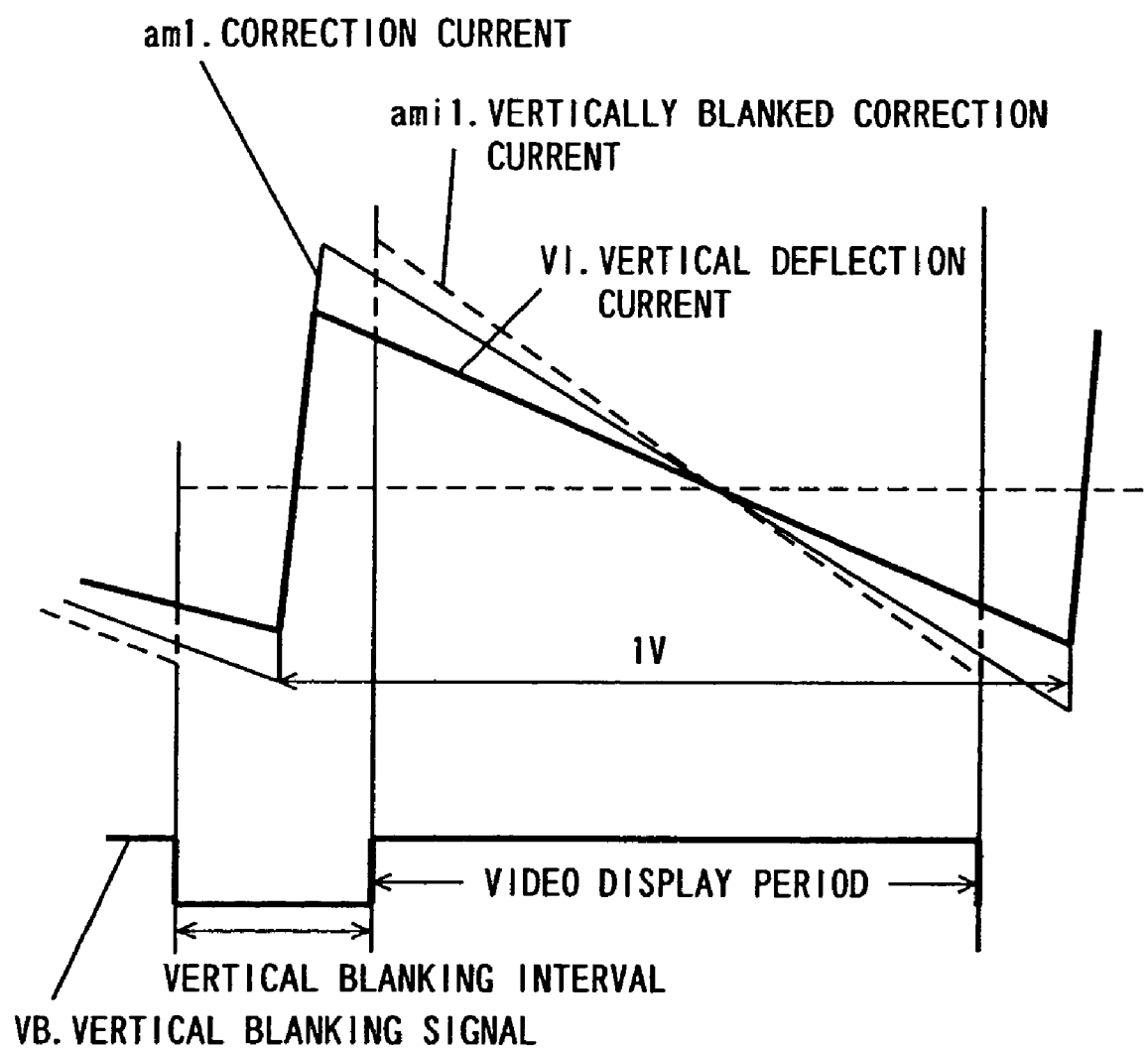
FIG. 11 is a waveform diagram showing a vertical deflection current, a correction current, a vertically blanked correction current, and a vertical blanking signal in the vertical deflection apparatus shown in FIG. 10.

FIG. 11 is a waveform diagram showing a vertical deflection current, a correction current, a vertically blanked correction current, and a vertical blanking signal in the horizontal deflection apparatus shown in FIG. 10. In FIG. 11, the waveforms of the correction current and the vertically blanked correction current are roughly illustrated.

When a correction current am1 is superimposed on the vertical deflection current VI, as shown in FIG. 11, the correction current am1 flows even in a vertical blanking interval where there is no video.

In the present embodiment, the value of the correction current ami1 is set to zero in the vertical blanking interval on the basis of the vertical blanking signal VB. Consequently, the power of the correction current output amplifier 7 in the vertical blanking interval can be saved.

In the vertical deflection apparatus according to the present embodiment, even when the deflection angle thereof is large, therefore, a gull-wing distortion is prevented from being generated without being affected by the HV crosstalk, thereby making it possible to sufficiently correct the generation of an NS pincushion distortion as well as to achieve power saving.

(3) Third Embodiment

Figure 12:
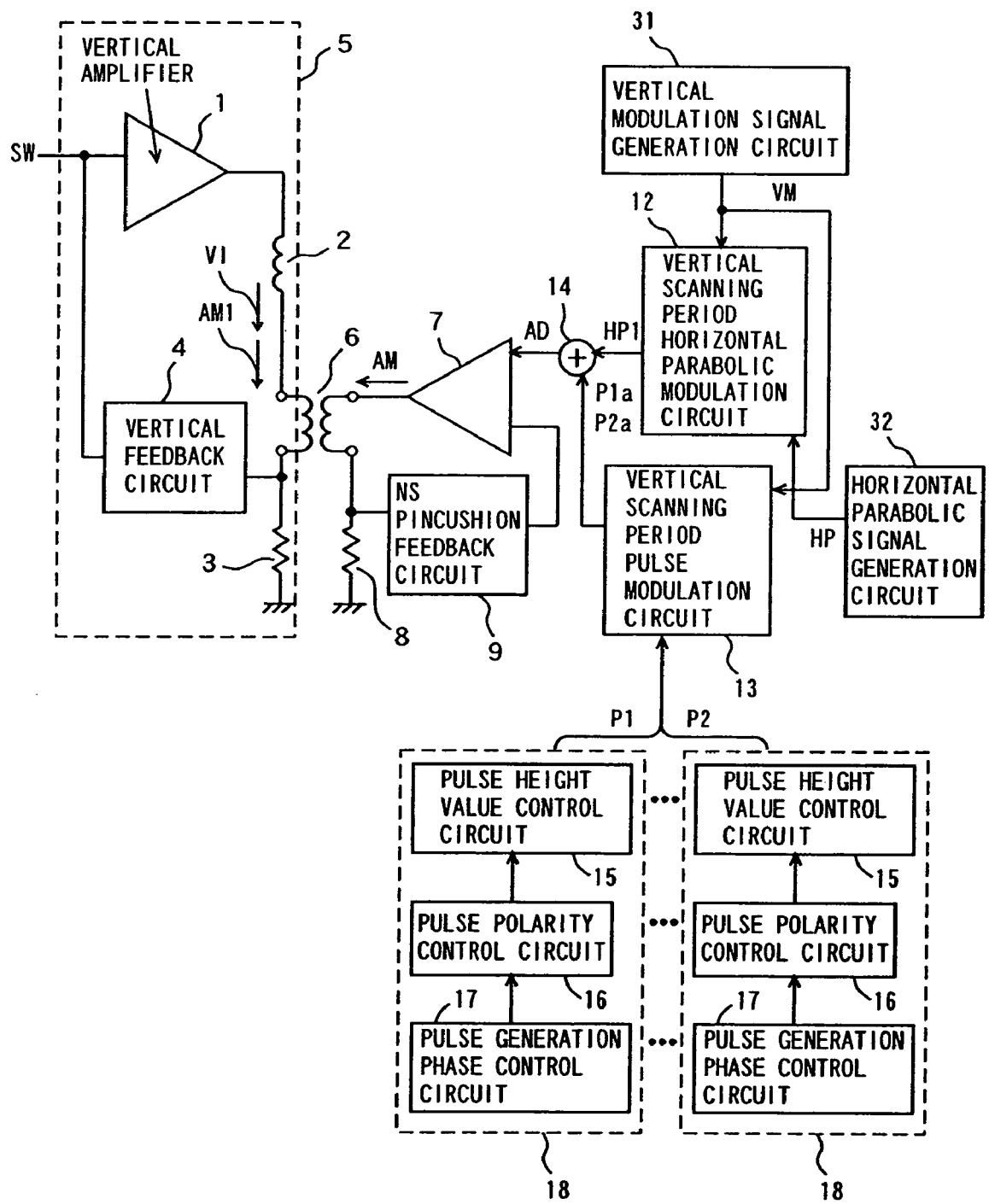
FIG. 12 is a block diagram showing the configuration of a vertical deflection apparatus in a third embodiment of the present invention.

FIG. 12 is a block diagram showing the configuration of a vertical deflection apparatus in a third embodiment of the present invention.

In the vertical deflection apparatus shown in FIG. 12, a vertical amplifier 1, a vertical deflection coil 2, a vertical current detection resistor 3, a vertical feedback circuit 4, and a secondary winding of a transformer 6 constitute a vertical output circuit 5. A sawtooth voltage SW, which changes in a vertical scanning period, is fed to an input terminal of the vertical amplifier 1. The vertical deflection coil 2, the secondary winding of the transformer 6, and the vertical current detection resistor 3 are connected in series between an output terminal of the vertical amplifier 1 and a ground terminal. A node of the secondary winding of the transformer 6 and the vertical current detection resistor 3 is connected to an input terminal of the vertical amplifier 1 through the vertical feedback circuit 4.

An output terminal of a correction current output amplifier 7 is connected to one end of a primary winding of the transformer 6. The other end of the primary winding of the transformer 6 is connected to the ground terminal through a correction current detection resistor 8. An output signal AD of an adder 14, described later, is fed to one input terminal of the correction current output amplifier 7. A node of the other end of the primary winding of the transformer 6 and the correction current detection resistor 8 is connected to the other input terminal of the correction current output amplifier 7 through an NS pincushion distortion feedback circuit 9.

A vertical modulation signal VM generated by a vertical modulation signal generation circuit 31 and a horizontal parabolic signal HP generated by a horizontal parabolic signal generation circuit 32 are fed to a parabolic modulation circuit 12. The parabolic modulation circuit 12 multiplies the horizontal parabolic signal HP and the vertical modulation signal VM together, to amplitude-modulate the horizontal parabolic signal HP using the vertical modulation signal VM, so as to outputs a modulated horizontal parabolic signal HP1 to the one input terminal of the adder 7. As shown in FIG. 2(c), in the first half of a vertical scanning interval, the polarity of the horizontal parabolic signal HP1 is not reversed, and the amplitude of the horizontal parabolic signal HP1 is gradually reduced in accordance with the level of the vertical modulation signal VM. In the latter half of the vertical scanning interval, the polarity of the horizontal parabolic signal HP1 is reversed, and the amplitude of the horizontal parabolic signal HP1 is gradually increased in accordance with the level of the vertical modulation signal VM.

The parabolic modulation circuit 12 shown in FIG. 12 may modulate the phase of the horizontal parabolic signal HP on the basis of the vertical modulation signal VM, similarly to the parabolic modulation circuit 12 shown in FIG. 1. Consequently, an NS pincushion distortion can be corrected without being affected by an HV crosstalk component.

The vertical deflection apparatus shown in FIG. 12 comprises a plurality of pulse generators 18. In the present embodiment, two pulse generators 18 are provided. Each of the pulse generators 18 comprises a pulse height value control circuit 15, a pulse polarity control circuit 16, and a pulse generation phase control circuit 17. The pulse generation phase control circuit 17 generates a pulse signal in a horizontal scanning period, and controls the phase or the pulse width of the pulse signal. The pulse polarity control circuit 16 controls the polarity of the pulse signal generated by the pulse generation phase control circuit 17. The pulse height value control circuit 15 controls the pulse height value of the pulse signal output from the pulse polarity control circuit 16. The pulse generation phase control circuits 17 in the pulse generators 18 respectively control the phases or the pulse widths of the pulse signals independently. The pulse polarity control circuits 16 in the pulse generators 18 respectively control the polarities of the pulse signals independently. Further, the pulse height value control circuits 15 in the pulse generators 18 respectively control the pulse height values of the pulse signals independently.

The vertical modulation signal VM and pulse signals P1 and P2 respectively generated by the plurality of pulse generators 18 are fed to a vertical scanning period pulse modulation circuit (hereinafter abbreviated as a pulse modulation circuit) 13. The pulse modulation circuit 13 modulates the pulse signals P1 and P2 respectively fed by the plurality of pulse generators 18 using the vertical modulation signal VM, and feeds modulated pulse signals P1a and P2a to the other input terminal of the adder 14.

The adder 14 adds the horizontal parabolic signal HP1 fed by the parabolic modulation circuit 12 and the pulse signals P1a and P2a respectively fed by the pulse modulation circuit 13 together, to feed the output signal AD representing the results of the addition to the one input terminal of the correction current output amplifier 7. Here, the parabolic modulation circuit 12 outputs the horizontal parabolic signal HP without reversing the polarity thereof in a front half portion of a sawtooth of the vertical modulation signal VM and gradually reduces the amplitude of the horizontal parabolic signal HP in accordance with the level of the sawtooth, and reverses the polarity of the horizontal parabolic signal HP in a rear half portion of the sawtooth of the vertical modulation signal VM and gradually increases the amplitude of the horizontal parabolic signal HP in accordance with the level of the sawtooth.

In the present embodiment, the pulse generator 18 shown in FIG. 12 is used in order to correct the difference between the square waveform and a waveform having a higher-order distortion component shown in FIG. 21.

The configuration and the operations of the horizontal parabolic signal generation circuit 32 shown in FIG. 12 are the same as the configuration and the operations of the horizontal parabolic signal generation circuit 32 shown in FIG. 1. In the vertical deflection apparatus according to the present embodiment, a gull-wing distortion is corrected by the pulse modulation circuit 13, the adder 14, and the pulse generators 18, as described later. Accordingly, the horizontal parabolic signal generation circuit 32 may not have the function of correcting the gull-wing distortion.

FIG. 13 is a waveform diagram for explaining the correction of an NS pincushion distortion in the vertical deflection apparatus shown in FIG. 12.

FIG. 13(a) illustrates the horizontal parabolic signal HP1 output from the parabolic modulation circuit 12, FIG. 13 (b) illustrates the pulse signals P1a and P2a output from the pulse modulation circuit 13, FIG. 13(c) illustrates the output signal AD of the adder 14, and FIG. 13(d) illustrates a correction current AM1 flowing through the vertical deflection coil 2.

As shown in FIG. 13(a), the horizontal parabolic signal HP1 having the second power (square) waveform which has been modulated by the vertical modulation signal VM is output from the parabolic modulation circuit 12. As shown in FIG. 13(b), the pulse signals P1a and P2a which have been modulated by the vertical modulation signal VM are output from the pulse modulation circuit 13.

As shown in FIG. 13(c), the horizontal parabolic signal HP1 shown in FIG. 13(a) and the pulse signals P1a and P2a shown in FIG. 13(b) are added together by the adder 14, so that the output signal AD representing the results of the addition is output.

Furthermore, the output signal AD of the adder 14 is amplified by the correction current output amplifier 7, so that a correction current AM output from the correction current output amplifier 7 flows through the primary winding of the transformer 6. A current generated in the secondary winding by the current flowing through the primary winding of the transformer 6 is integrated by the vertical deflection coil 2. Consequently, a pulse component is integrated, so that the correction current AM1 shown in FIG. 13(d) for correcting a higher-order distortion component is obtained. Consequently, the gull-wing distortion shown in FIG. 20(c) is prevented from being generated.

As described in the foregoing, the pulse generator 18 shown in FIG. 12 comprises the pulse generation phase control circuit 17, the pulse polarity control circuit 16, and the pulse height value control circuit 15. Accordingly, it is possible to change the phases of the pulse signals P1a and P2a, the widths of the pulse signals P1a and P2a, the pulse height values of the pulse signals P1a and P2a, and the polarities of the pulse signals P1a and P2a. Consequently, it is possible to correct higher-order distortion components respectively having various sizes, widths, and polarities.

In the example shown in FIG. 13, the pulse signals P1a and P2a each having a negative polarity are illustrated. When a pulse signal having a positive polarity is generated from the pulse generator 18, however, a broken line portion of the correction current AM1 shown in FIG. 13(d) is in an upwardly projected shape.

Although in the present embodiment, description is made of a case where two sets of pulse generators 18 are used, a distortion in the vertical deflection current VI due to a local distortion on the vertical deflection coil 2 can be also corrected by preparing a third or fourth pulse generator.

As described in the foregoing, in the vertical deflection apparatus according to the present embodiment, even when the deflection angle thereof is large, the gull-wing distortion is prevented from being generated, thereby making it possible to sufficiently correct the NS pincushion distortion. Further, it is possible to correct an NS pincushion distortion having a higher-order distortion component generated by a combination of a flattened CRT and a deflection yoke without being affected by HV crosstalk. Further, it is possible to also correct an asymmetrical NS distortion.

In this case, if the correction current detection resistor 8, the NS pincushion distortion feedback circuit 9, the parabolic modulation circuit 12, the pulse modulation circuit 13, the adder 14, the plurality of pulse generators 18, and so forth are constructed as an IC (Integrated Circuit), the NS pincushion distortion can be corrected only by such an IC, the transformer 6 and the correction current output amplifier 7, thereby making it possible to correct the NS pincushion distortion at low cost.

In the present embodiment, the vertical amplifier 1 corresponds to a vertical deflection current output circuit, the horizontal parabolic signal generation circuit 32 and the parabolic modulation circuit 12 correspond to a correction circuit, and the pulse generators 18 correspond to a pulse generation circuit. Further, the adder 14 corresponds to a synthesizer, and the transformer 6 and the correction current output amplifier 7 correspond to a superimposition device. Furthermore, the parabolic modulation circuit 12 corresponds to a first modulation circuit, and the pulse modulation circuit 13 corresponds to a second modulation circuit.

(4) Fourth Embodiment

Figure 14:
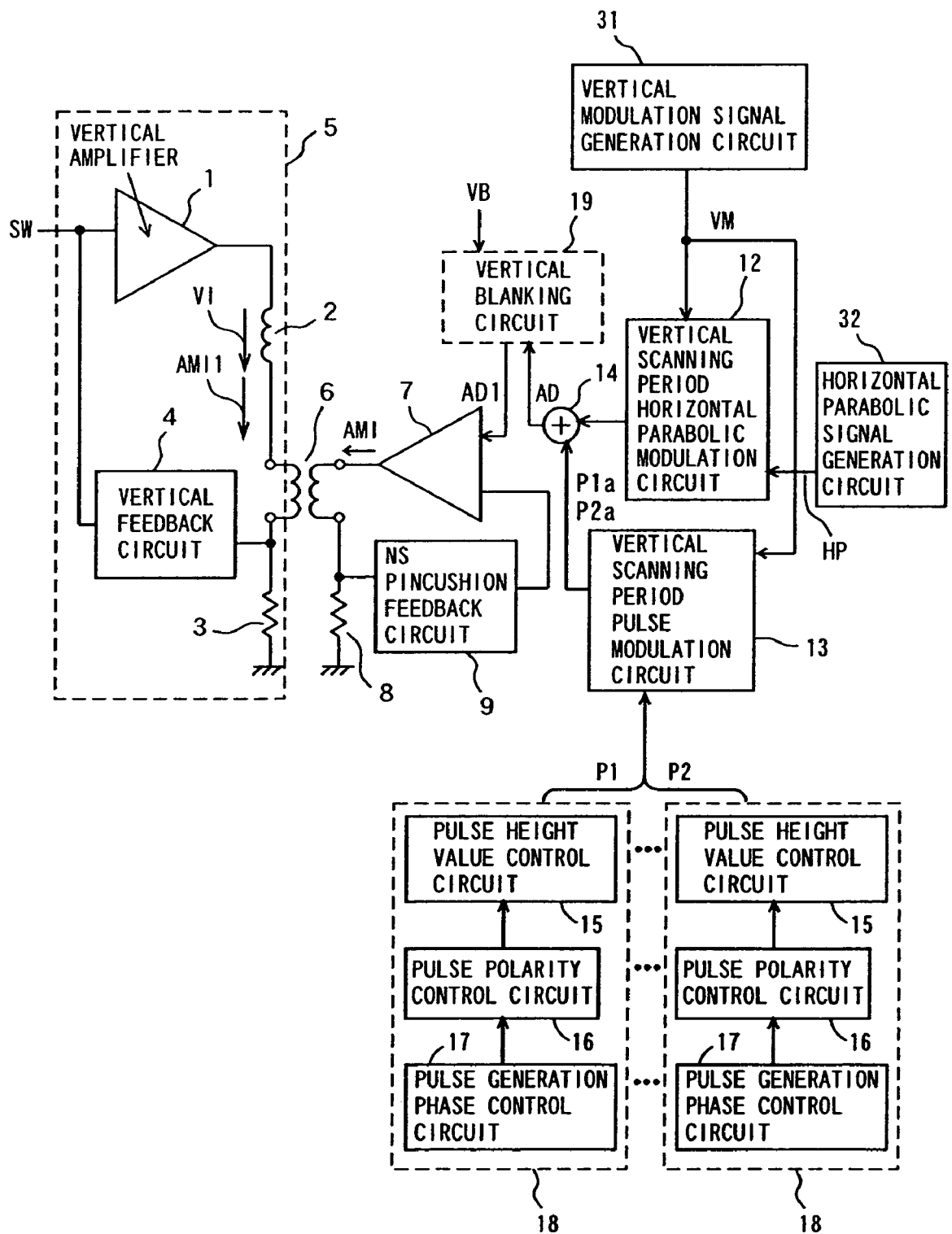
FIG. 14 is a block diagram showing the configuration of a vertical deflection apparatus in a fourth embodiment of the present invention.

FIG. 14 is a block diagram showing the configuration of a vertical deflection apparatus in a fourth embodiment of the present invention. The vertical deflection apparatus in the present embodiment has a configuration for power saving.

In the vertical deflection apparatus shown in FIG. 14, a vertical blanking circuit 19 indicated by a dotted line is further added to the configuration of the vertical deflection apparatus shown in FIG. 12. The vertical blanking circuit 19 corresponds to a blanking circuit.

A vertical blanking signal VB and an output signal AD of an adder 14 are fed to the vertical blanking circuit 19. An output signal AD1 of the vertical blanking circuit 19 is fed to one input terminal of a correction current output amplifier 7.

Figure 15:
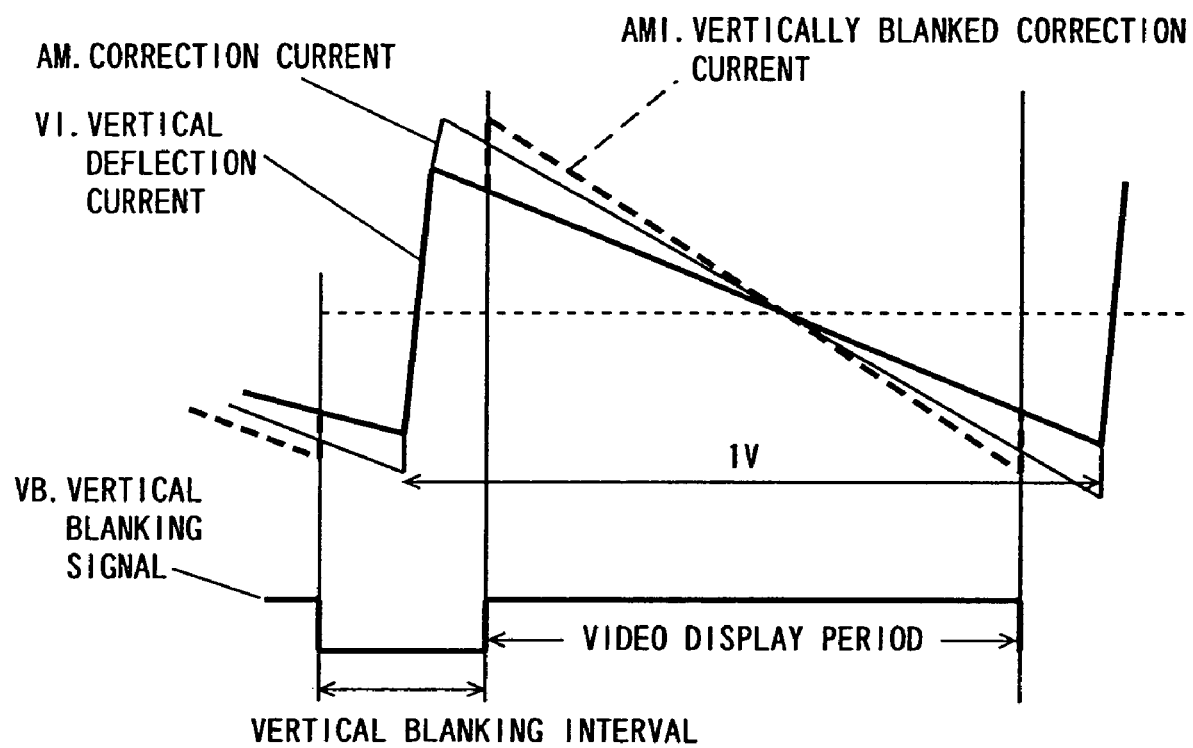
FIG. 15 is a waveform diagram showing a vertical deflection current, a correction current, a vertically blanked correction current, and a vertical blanking signal in the vertical deflection apparatus shown in FIG. 14.
Figure 16A:
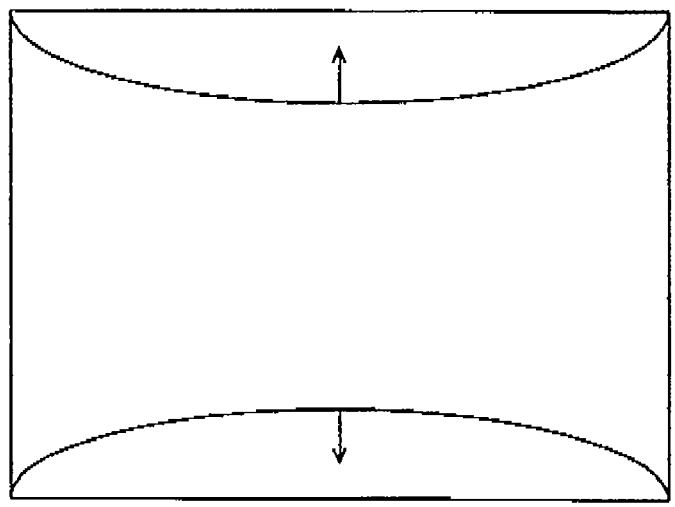
FIG. 16 is a diagram showing an example of an NS pincushion distortion on a screen of a CRT, and a diagram showing an NS pincushion distortion correction current superimposed on a vertical deflection current.
Figure 16B:
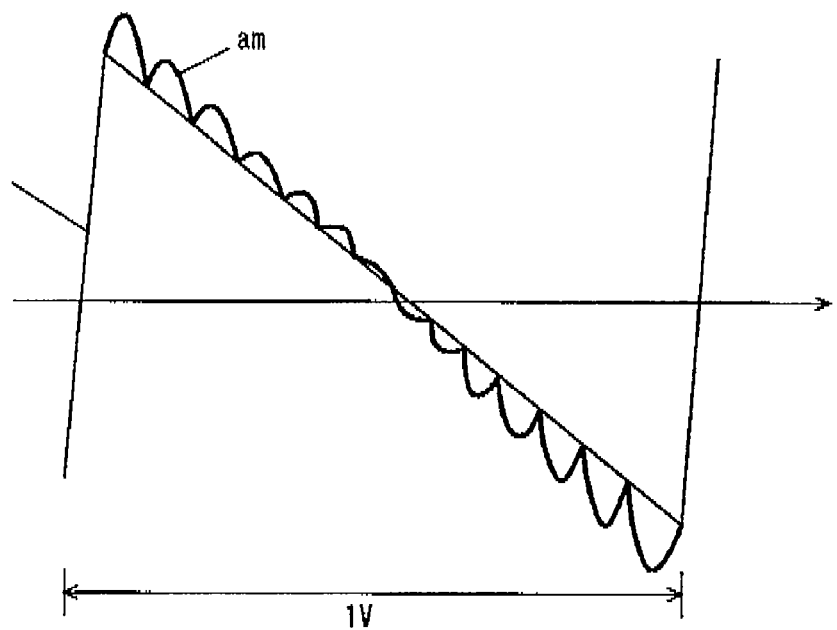
Figure 17A:
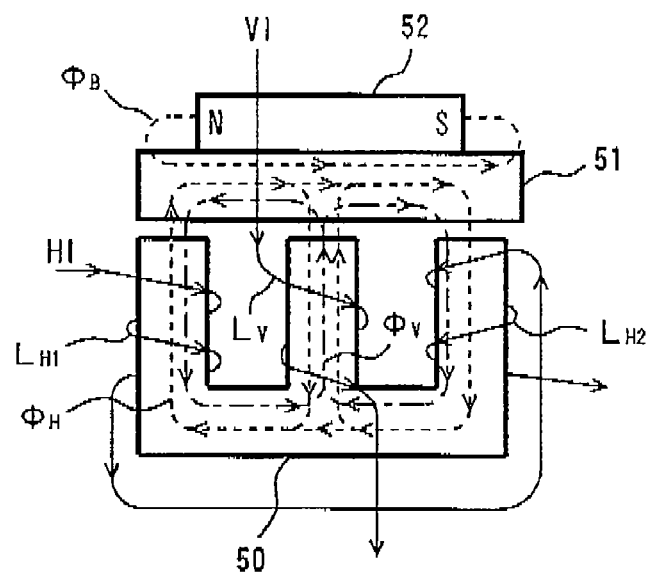
FIG. 17 is a schematic view showing the correction of an NS pincushion distortion by a conventional supersaturated reactor system.
Figure 17B:
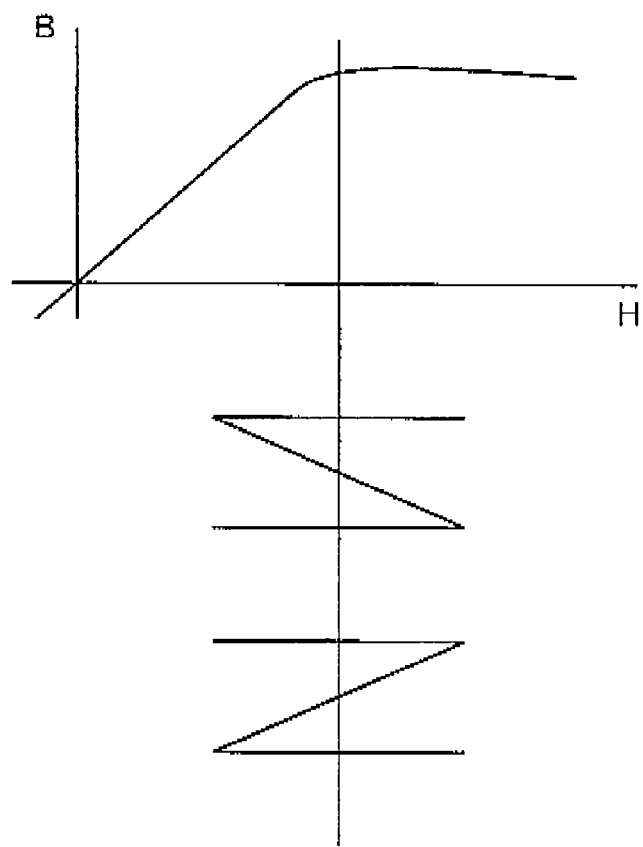

FIG. 15 is a waveform diagram showing a vertical deflection current, a correction current, a vertically blanked correction current, and a vertical blanking signal in the horizontal deflection apparatus shown in FIG. 14. In FIG. 15, the waveforms of the correction current and the vertically blanked correction current are roughly illustrated.

When a correction current AM is superimposed on a vertical deflection current VI, as shown in FIG. 15, the correction current AM flows even in a vertical blanking interval where there is no video.

In the present embodiment, the value of a correction current AMI is set to zero in a vertical blanking interval on the basis of the vertical blanking signal VB. Consequently, the power of the correction current output amplifier 7 in the vertical blanking interval can be saved.

In the vertical deflection apparatus according to the present embodiment, even when the deflection angle thereof is large, therefore, a gull-wing distortion is prevented from being generated, thereby making it possible to sufficiently correct an NS pincushion distortion without being affected by HV crosstalk as well as to achieve power saving.

Although each of the vertical deflection apparatuses according to the foregoing first to fourth embodiments have the function of correcting the HV crosstalk, the function of correcting the asymmetrical NS pincushion distortion, and the function of correcting the gull-wing distortion, the vertical deflection apparatus may have any one or two of the functions.

According to the present invention, the phase of the correction signal is modulated in the vertical scanning period, so that the effect of the crosstalk component induced from the horizontal deflection coil to the vertical deflection coil is corrected. Consequently, the north-south pincushion distortion can be sufficiently corrected without being affected by the crosstalk.

The correction circuit has the function of shifting the phase at the peak of the correction signal from the middle of the horizontal scanning interval, thereby making it possible to sufficiently correct the asymmetrical north-south pincushion distortion.

Furthermore, the higher-order distortion component generated in the north-south pincushion distortion can be corrected by a combination of a parabolic waveform and another function waveform. Even when the deflection angle is large, therefore, the gull-wing distortion is prevented from being generated without being affected by the crosstalk, thereby making it possible to sufficiently correct the north-south pincushion distortion.

Furthermore, the pulse component corresponding to the pulse signal in the correction current superimposed on the vertical deflection current is integrated by the vertical deflection coil, so that the higher-order distortion component generated in the north-south pincushion distortion is corrected by the integrated pulse component. Even when the deflection angle is large, therefore, the gull-wing distortion is prevented from being generated, thereby making it possible to sufficiently correct the north-south pincushion distortion.

The invention claimed is:

1. A vertical deflection apparatus supplying a vertical deflection current to a vertical deflection coil to deflect an electron beam in the vertical direction of a screen, comprising:
   a vertical deflection current output circuit that outputs a vertical deflection current to said vertical deflection coil;
   a correction circuit that outputs a correction signal periodically changing in a parabolic shape in a horizontal scanning period to correct a north-south pincushion distortion;
   a modulation circuit that modulates the phase of the correction signal output from said correction circuit in a vertical scanning period; and
   a superimposition device that superimposes a correction current based on an output signal of said modulation circuit on the vertical deflection current, wherein
   said correction circuit comprises
   a folded waveform generator that generates a folded waveform changing in a sawtooth shape in the horizontal scanning period and having a bending point at a level which is half the amplitude thereof,
   a turn-up waveform generator that generates a turn-up waveform obtained by turning up a portion below the level which is half the amplitude thereof in the folded waveform generated by said folded waveform generator at said bending point, and
   a correction signal generator that generates said correction signal having a peak corresponding to a turn-up point of said turn-up waveform generated by said turn-up waveform generator.

2. The vertical deflection apparatus according to claim 1, wherein said correction signal generator generates said correction signal by raising said turn-up waveform to the n-th power, where said n is a real number.

3. The vertical deflection apparatus according to claim 1, wherein said correction circuit outputs said correction signal by a combination of a parabolic waveform changing in the horizontal scanning period and another function waveform.

4. A vertical deflection apparatus supplying a vertical deflection current to a vertical deflection coil to deflect an electron beam in the vertical direction of a screen, comprising:
   a vertical deflection current output circuit that outputs a vertical deflection current to said vertical deflection coil;
   a correction circuit that outputs a correction signal periodically changing in a parabolic shape in a horizontal scanning period to correct a north-south pincushion distortion;
   a modulation circuit that modulates the phase of the correction signal output from said correction circuit in a vertical scanning period;
   a superimposition device that superimposes a correction current based on an output signal of said modulation circuit on the vertical deflection current;
   a plurality of pulse generation circuits that respectively generate pulse signals in the horizontal scanning period; and
   a synthesizer that synthesizes the pulse signals respectively generated by said plurality of pulse generation circuits with the correction signal output from said correction circuit, said superimposition device superimposing a correction current based on an output signal of said synthesizer on the vertical deflection current.

5. The vertical deflection apparatus according to claim 4, further comprising a blanking circuit that sets said correction current to zero in a vertical blanking interval.

6. A vertical deflection apparatus for supplying a vertical deflection current to a vertical deflection coil to deflect an electron beam in the vertical direction of a screen, comprising:
- a vertical deflection current output circuit that outputs a vertical deflection current to said vertical deflection coil;
- a correction circuit that outputs a correction signal periodically changing in a parabolic shape in a horizontal scanning period to correct a north-south pincushion distortion; and
- a superimposition device that superimposes a correction current based on the correction signal output from said correction circuit on the vertical deflection current, wherein
- said correction circuit has the function of shifting the phase at the peak of said correction signal from the middle of a horizontal scanning interval, and
- said correction circuit comprises
- a folded waveform generator that generates a folded waveform changing in a sawtooth shape in the horizontal scanning period and having a bending point at a level which is half the amplitude thereof,
- a turn-up waveform generator that generates a turn-up waveform obtained by turning up a portion below the level which is half the amplitude thereof in the folded waveform generated by said folded waveform generator at said bending point, and
- a correction signal generator that generates said correction signal having a peak corresponding to a turn-up point of said turn-up waveform generated by said turn-up waveform generator.

7. The vertical deflection apparatus according to claim 6, wherein said correction signal generator generates said correction signal by raising said turn-up waveform to the n-th power, where said n is a real number.

8. The vertical deflection apparatus according to claim 6, wherein said correction circuit outputs said correction signal by a combination of a parabolic waveform changing in the horizontal scanning period and another function waveform.

9. A vertical deflection apparatus supplying a vertical deflection current to a vertical deflection coil to deflect an electron beam in the vertical direction of a screen, comprising:
- a vertical deflection current output circuit that outputs a vertical deflection current to said vertical deflection coil;
- a correction circuit that outputs a correction signal periodically changing in a parabolic shape in a horizontal scanning period to correct a north-south pincushion distortion;
- a superimposition device that superimposes a correction current based on the correction signal output from said correction circuit on the vertical deflection current;
- a plurality of pulse generation circuits that respectively generate pulse signals in the horizontal scanning period; and
- a synthesizer that synthesizes the pulse signals respectively generated by said plurality of pulse generation circuits with the correction signal output from said correction circuit,
- said superimposition device superimposing a correction current based on an output signal of said synthesizer on the vertical deflection current.

10. The vertical deflection apparatus according to claim 9, further comprising a blanking circuit that sets said correction current to zero in a vertical blanking interval.

* * * * *